(12) United States Patent
Pitcel et al.

(10) Patent No.: US 8,863,485 B2
(45) Date of Patent: Oct. 21, 2014

(54) HYBRID LAWN MOWER DRIVE SYSTEM

(71) Applicant: Briggs & Stratton Corporation, Wauwatosa, WI (US)

(72) Inventors: Michael Pitcel, Waukesha, WI (US); William Latus, Menomonee Falls, WI (US); Robert Koenen, Pewaukee, WI (US); David Procknow, Elm Grove, WI (US); Jeffrey Berger, Port Washington, WI (US); Jason Elvers, Horicon, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 77 days.

(21) Appl. No.: 13/734,734

(22) Filed: Jan. 4, 2013

(65) Prior Publication Data
US 2014/0013722 A1 Jan. 16, 2014

Related U.S. Application Data

(60) Provisional application No. 61/583,479, filed on Jan. 5, 2012.

(51) Int. Cl.
*A01D 69/00* (2006.01)
*B60K 6/46* (2007.10)
(Continued)

(52) U.S. Cl.
CPC ............ *B60W 20/20* (2013.01); *B60K 6/46* (2013.01); *B60K 6/442* (2013.01); *H02K 7/1815* (2013.01); *Y10S 903/903* (2013.01); *B60W 20/40* (2013.01); *B60Y 2200/223* (2013.01); *A01D 69/025* (2013.01); *B60W 10/30* (2013.01); *B60K 6/20* (2013.01); *A01D 34/00* (2013.01)
USPC ....................................... 56/10.2 R; 903/903

(58) Field of Classification Search
CPC ......... B60R 25/04; B60R 25/045; F02N 3/02; F02N 7/08; F02N 15/00; F02N 15/006; F02N 15/027; F02N 15/022; F02N 11/00; F02D 41/042; F02D 2009/0216; A01D 34/6818; A01D 34/828; A01D 34/78; A01D 69/025; H02P 4/00
USPC ........... 56/10.2 R, 10.2 A–10.2 E, 10.5, 10.8, 56/11.1, 11.3, 11.7, 11.8; 172/40–42; 180/6.54, 6.58, 19.3, 6.62, 315, 333, 180/334, 331, 323; 123/185.14; 318/139, 318/599, 727, 809
See application file for complete search history.

(56) References Cited

U.S. PATENT DOCUMENTS 5,562,173 A 10/1996 Olson
6,603,227 B2 8/2003 Rose, Sr.
(Continued)

OTHER PUBLICATIONS

Greens Mowers, Ride-on and Pedestrian Greens Mowers, John Deere Golf, downloaded from www.deere.com on Jan. 3, 2013, believed to be available prior to Jan. 5, 2012, 16 pages.

*Primary Examiner* — Robert Pezzuto
(74) *Attorney, Agent, or Firm* — Foley & Lardner LLP

(57) ABSTRACT

A lawn mower includes an engine, an energy storage device, a motor/generator including an output shaft, an engine coupling, wherein, with the engine coupling disengaged, the motor/generator drives the output shaft, and with the engine coupling engaged, the engine or both the motor/generator and the engine drive the output shaft, a mower blade, a power take-off clutch, and a control unit configured to implement a first operating condition in which the engine coupling is disengaged, the engine is off, and the output shaft is driven by the motor/generator, and configured to implement a second operating condition in which the engine coupling is engaged, the engine is on, the output shaft is driven by the engine or both the motor/generator and the engine.

7 Claims, 14 Drawing Sheets

(51) Int. Cl.
*B60K 6/442* (2007.10)
*H02K 7/18* (2006.01)
*B60W 20/00* (2006.01)
*A01D 69/02* (2006.01)
*B60W 10/30* (2006.01)
*B60K 6/20* (2007.10)
*A01D 34/00* (2006.01)

(56) References Cited

U.S. PATENT DOCUMENTS

| | | | |
|---|---|---|---|
| 6,604,348 | B2 | 8/2003 | Hunt |
| 6,617,725 | B2 | 9/2003 | Rose, Sr. |
| 6,948,299 | B2 | 9/2005 | Osborne |
| 6,987,328 | B2 | 1/2006 | Osborne |
| 7,017,327 | B2 | 3/2006 | Hunt et al. |
| 7,610,975 | B1 | 11/2009 | Gust et al. |

HYBRID LAWN MOWER DRIVE SYSTEM

CROSS-REFERENCE TO RELATED PATENT APPLICATIONS

This application claims the benefit of Provisional Application No. 61/583,479, filed Jan. 5, 2012, which is incorporated herein by reference in its entirety.

BACKGROUND

The present application relates generally to the field of drive systems for lawn tractors. More specifically, the present application relates to a drive system including an internal combustion engine and secondary drive such as an electric motor.

Lawn tractors are generally driven by an internal combustion engine, with the engine being used to power both the wheels to propel the vehicle and to power an accessory, such as cutting blades via a power take-off device. While driving the wheels can be a lower power draw, operating the accessory can be a much higher power draw. Internal combustion engines are generally most efficient when operated in a narrow power band. It can therefore be advantageous to supplement or replace an internal combustion engine with a secondary power source, such as electric motor.

Electric lawn tractors use batteries to power both deck motors (for driving the cutting blades) and wheel motors to drive the wheels. However, utilizing only battery power can be limiting. High power draw of deck motors can quickly discharge batteries. Once the batteries are drained, there is an extensive re-charge period. The power draw can be reduced to extend cutting times by reducing blade speed, utilizing smaller diameter decks, and utilizing lower lift blades. While these solutions reduce power draw, they can also negatively affect the cutting performance of the lawn tractor.

SUMMARY

One embodiment of the invention relates to a lawn mower including an internal combustion engine, an energy storage device, a motor/generator including an output shaft, wherein when operating as a motor, the motor/generator is powered by the energy storage device and, when operating as a generator, the motor/generator provides power to the energy storage device, an engine coupling, wherein, with the engine coupling disengaged, the motor/generator drives the output shaft, and with the engine coupling engaged, the engine or both the motor/generator and the engine drive the output shaft, a mower blade, a power take-off clutch, wherein with the power take-off clutch engaged, the output shaft drives the mower blade, with the power take-off clutch disengaged, the mower blade is not driven, and a control unit configured to implement a first operating condition in which the engine coupling is disengaged, the engine is off, and the output shaft is driven by the motor/generator, and configured to implement a second operating condition in which the engine coupling is engaged, the engine is on, and the output shaft is driven by the engine or both the motor/generator and the engine.

Another embodiment of the invention relates to outdoor power equipment including an internal combustion engine, an energy storage device, a motor/generator including an output shaft, wherein when operating as a motor, the motor/generator is powered by the energy storage device and, when operating as a generator, the motor/generator provides power to the energy storage device, an engine coupling, wherein, with the engine coupling disengaged, the motor/generator drives the output shaft, and with the engine coupling engaged, the engine or both the motor/generator and the engine drive the output shaft, an implement, a power take-off clutch, wherein with the power take-off clutch engaged, the output shaft drives the implement, with the power take-off clutch disengaged, the implement is not driven, and a control unit configured to implement a first operating condition in which the engine coupling is disengaged, the engine is off, and the output shaft is driven by the motor/generator, and configured to implement a second operating condition in which the engine coupling is engaged, the engine is on, and the output shaft is driven by the engine or both the motor/generator and the engine.

Another embodiment of the invention relates to a power pack assembly including an internal combustion engine including an engine output shaft, a motor/generator including a motor/generator output shaft, an engine coupling for selectively engaging the engine output shaft with the motor/generator output shaft, wherein, with the engine coupling disengaged, the motor/generator drives the motor/generator output shaft, and with the engine coupling engaged, the engine or both the motor/generator and the engine drive the motor/generator output shaft, and a frame that supports the engine and the motor/generator.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
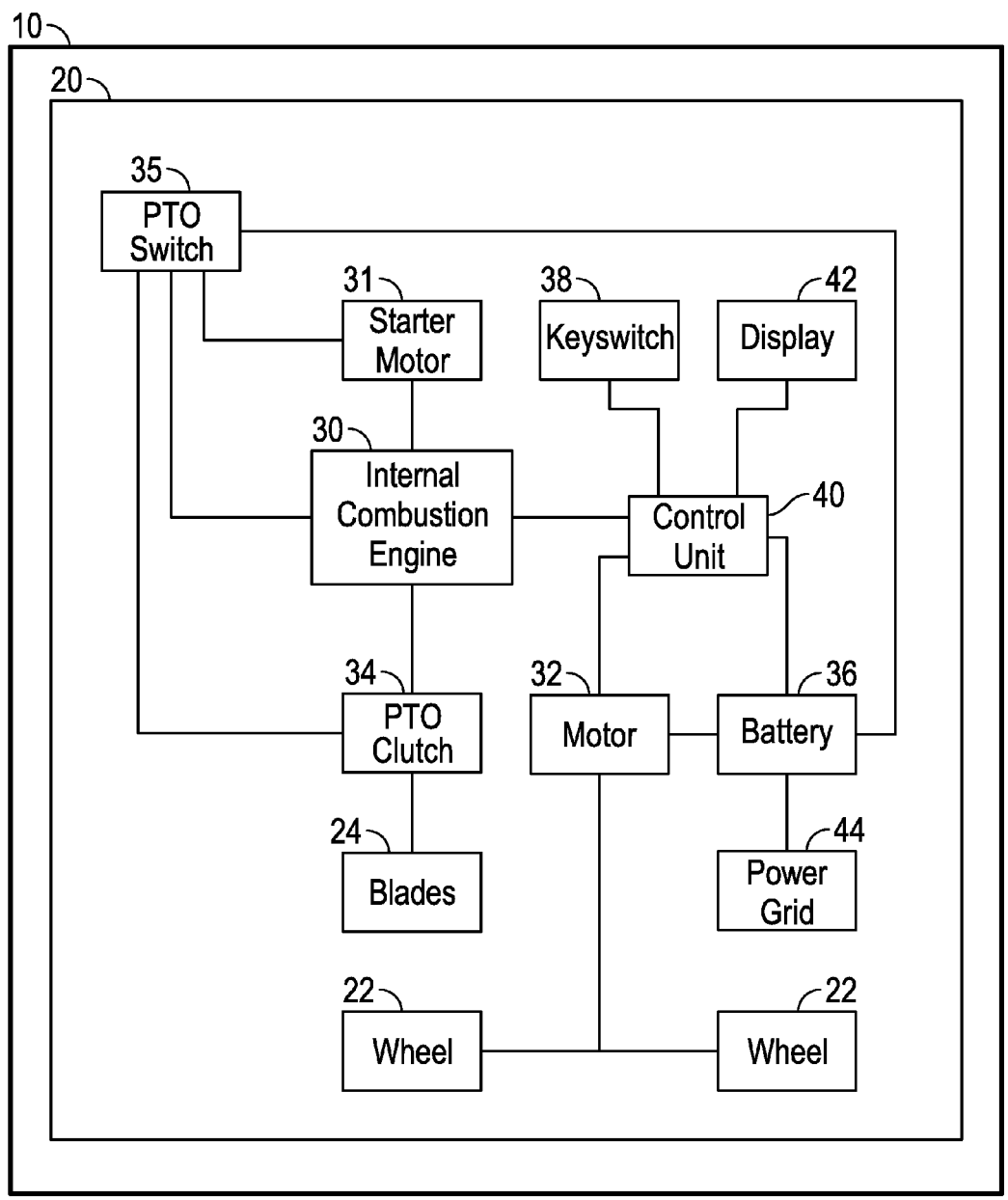
FIG. 1 is a schematic block diagram of a hybrid drive system for a lawn tractor, according to an exemplary embodiment.

Referring to FIG. 1, a schematic block diagram of a hybrid drive system 20 for outdoor power equipment or a vehicle 10 such as a lawn tractor is shown according to an exemplary embodiment. The drive system 20 provides power to at least one drive wheel 22 to propel the vehicle 10 and provides power to an implement or accessory, (e.g., one or more rotating blades 24, an auger, a tiller, a snow thrower, a brush, a reel mower, etc.). As shown, the drive system 20 may be a split power hybrid system, with an internal combustion engine 30 and an electric motor 32. In one embodiment, the hybrid drive system 20 is configured for a lawn tractor (e.g., riding lawn mower). In other embodiments, the hybrid drive system may be configured for another vehicle, such as a tractor. In still other embodiments, the hybrid drive system 20 may be configured for another device such as a walk behind lawn mower (e.g., a push mower), a stand on mower, a cultivator, a snowthrower, etc.

According to an exemplary embodiment, the engine 30 is a four cycle (i.e., four piston strokes per cycle) engine that converts chemical energy in a fuel such as gasoline into mechanical energy. In other contemplated embodiments, the engine 30 may be a two-stroke engine. The engine 30 may be a single cylinder engine or may have more than one cylinder. The engine may be oriented such that the drive shaft is horizontal, vertical, or angled. In other exemplary embodiments, the engine 30 may be configured to consume other fuels, such as diesel fuel, liquid propane, fuel oil, natural gas, alcohol, kerosene, or hydrogen. The engine 30 may be started manually (e.g., with a pull cord), or via another device such as a starter motor 31.

The engine 30 outputs mechanical power through the crankshaft to an accessory such as blades 24. As shown in FIG. 1, the blades 24 may receive power from the engine 30 via a device such as a power take-off (PTO) clutch 34. In some embodiments, the PTO clutch 34 may be a manual clutch or may be an electric clutch. The PTO clutch 34 can be selectively disengaged to decouple the blades 24 from the engine 30, allowing the engine 30 to run without operating the blades 24.

The motor 32 receives power from an on-board energy storage device. As shown in FIG. 1, the motor 32 may receive power from an energy storage device (e.g., battery 36). The battery 36 may be any suitable electrochemical device, such as a lead-acid battery, nickel metal hydride battery, a lithium-ion battery. In other embodiments, the motor 32 may receive electrical power from another energy storage device, such as an ultracapacitor or a combination of energy storage devices.

The battery 36 or other energy storage device is charged by coupling the battery 36 to an exterior power source, such as by plugging into an external power grid 44. While a single motor 32 is shown in FIG. 1, in other exemplary embodiments, separate wheel hub motors may be provided for each driven wheel 22 (see FIG. 3). If a single motor 32 is utilized, as shown in FIG. 1, the motor 32 may power the wheels 22 through a device such as a differential to allow each wheel to rotate at a different speed.

Figure 2:
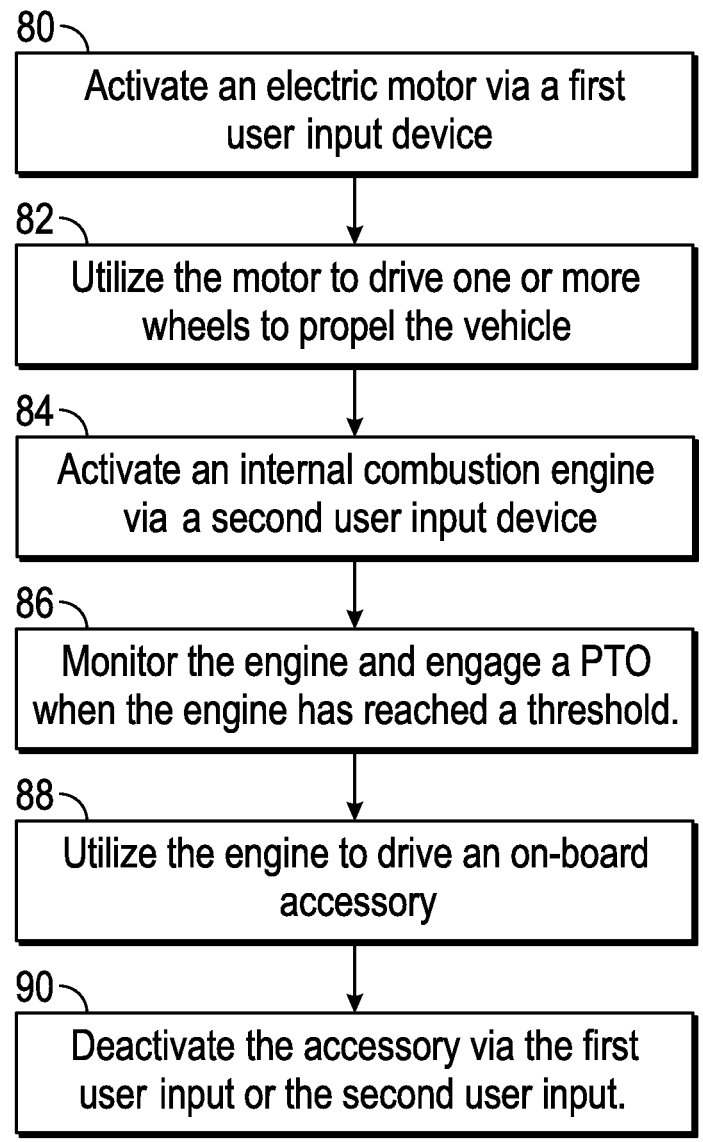
FIG. 2 is a flowchart of a method for operating the hybrid drive system of FIG. 1, according to an exemplary embodiment.

An exemplary method for operating the system hybrid drive system 20 is shown in FIG. 2. According to an exemplary embodiment, the motor 32 may be utilized to operate the wheels 22 without starting the engine 30 (step 80). The hybrid drive system 20 therefore allows the vehicle 10 to be driven while consuming only stored electrical power (step 82). A user may enable the motor 32 via a user interface, such as a keyswitch 38 or another suitable device, such as a pushbutton, a toggle switch, etc. The motor 32 begins to turn when an accelerator pedal is depressed. In some embodiments, the motor speed is controlled by a sensor on the accelerator pedal that measures the travel of the accelerator pedal and sends a signal to the control unit that provides an output to the motor to operate at the appropriate motor speed corresponding to the travel of the accelerator pedal. Alternatively, speed inputs other than a foot pedal could be used.

The user activates the blades 24 by engaging the PTO clutch 34 with a PTO interface device or switch 35 (step 84). According to a preferred embodiment, the PTO switch 35 is a momentary push button switch coupled to an electric PTO with a feedback feature to indicate to a user that the blades 24 are active. For instance, all or a portion of the PTO switch 35 may light up when the PTO clutch 34 is engaged. In other embodiments, the vehicle 10 may include a warning light or icon that is illuminated when the PTO clutch 34 is engaged. In other embodiments, the PTO switch 35 may be another device such as a lever to engage a manual PTO.

Referring still to FIG. 2, in one embodiment, pressing the PTO switch 35 starts the engine 30 (e.g., via the starter motor 31). In one embodiment, the switch 35 or another suitable control device monitors the performance of the engine 30 and engages the PTO clutch 34 after the engine 30 has stabilized and reached a predetermined threshold (step 86). In various exemplary embodiments, the PTO may be engaged based on various engine criteria, such as engine speed (RPM), engine temperature, or engine run time. In another embodiment, the PTO switch 35 monitors the starter motor 31 and engages the PTO clutch 34 when the starter motor 31 has disengaged. The user may press the PTO switch 35 again to disengage the PTO clutch 34 and deactivate the blades 24. Deactivating the blades 24 may also deactivate the engine 30. In one embodiment, turning off the vehicle 10 (e.g., by turning the keyswitch 38 off), both turns off the motor 32 and resets the PTO switch 35 to the off position, deactivating the engine 30 and the blades 24 and disengaging the PTO clutch 34 (step 90). In this way, when the vehicle 10 is turned back on using the keyswitch 38, the blades 24 do not automatically activate.

The hybrid drive system 20 may further include a control unit 40. The control unit 40 performs various monitoring and diagnostic functions, including monitoring the charging and discharging rates of the battery 36, monitoring the state of charge (SOC) or depth of discharge (DOD) of the battery, monitoring and controlling the cooling of the battery 36, and monitoring the temperature and voltage of the battery 36. The SOC and DOD measure the charge of the battery 36. The SOC is measured from 100% (i.e., fully charged) to 0% (i.e., no charge) and the DOD is measured from 0% (i.e., fully charged or no discharge) to 100% (i.e., no charge or fully discharged).

Either SOC or DOD can be used to indicate how much charge is present in the battery 36. Embodiments or examples described herein with reference to one of SOC and DOD are also applicable to the other of SOC and DOD. The control unit 40 may be coupled to a display 42 to convey status messages and information to the user of the vehicle 10.

According to an exemplary embodiment, the control unit 40 monitors the rotational speed of the blades 24. If the rotational speed of the blades 24 decreases (e.g., because of wet, tall, or dense grass), the control unit 40 may be selectively utilized to control the output of the motor 32 to decrease the ground speed of the vehicle 10 to decrease the cutting load on the blades 24 and maintain a certain rotational speed for the blades 24. The amount which the control unit 40 reduces the ground speed of the vehicle 10 may be limited, such as a maximum reduction of approximately 2 mph. The control unit 40 may indicate on the display 42 when the ground speed of the vehicle 10 is being reduced to compensate for a reduction in rotational speed of the blades 24.

According to another exemplary embodiment, the control unit 40 monitors the DOD of the battery 36. If the DOD of the battery exceeds a predetermined level (e.g., an 80% DOD), the control unit 40 may deactivate the blades 24 and the engine 30. The display 42 may include a warning to indicate to the user of the vehicle 10 that the battery 36 has a low DOD and should be recharged. Such a warning may be a text warning, an icon, a flashing light, or an audio warning.

According to another exemplary embodiment, the engine 30 may include a zero droop governor to better maintain the rotational speed of the blades 24. The engine may further include an auto choke to allow a user to more easily activate the engine 30.

The split power hybrid drive system 20 combines the positive features of an electric drive and a conventional internal combustion engine system. The hybrid drive system 20 may be utilized with any cutting size deck, blade design, or blade tip speed, since the blades 24 are being driven by the engine 30. The hybrid drive system 20 provides a fuel savings of approximately 15-30% over a conventional system and allows for noise reduction through the use of a smaller engine or a larger engine operated at a lower speed to reduce NVH (noise, vibration, and harshness). For example, the engine may be operated at a speed less than the speed of the blade, with pulley ratios selected to maintain a desired blade tip speed.

Figure 3:
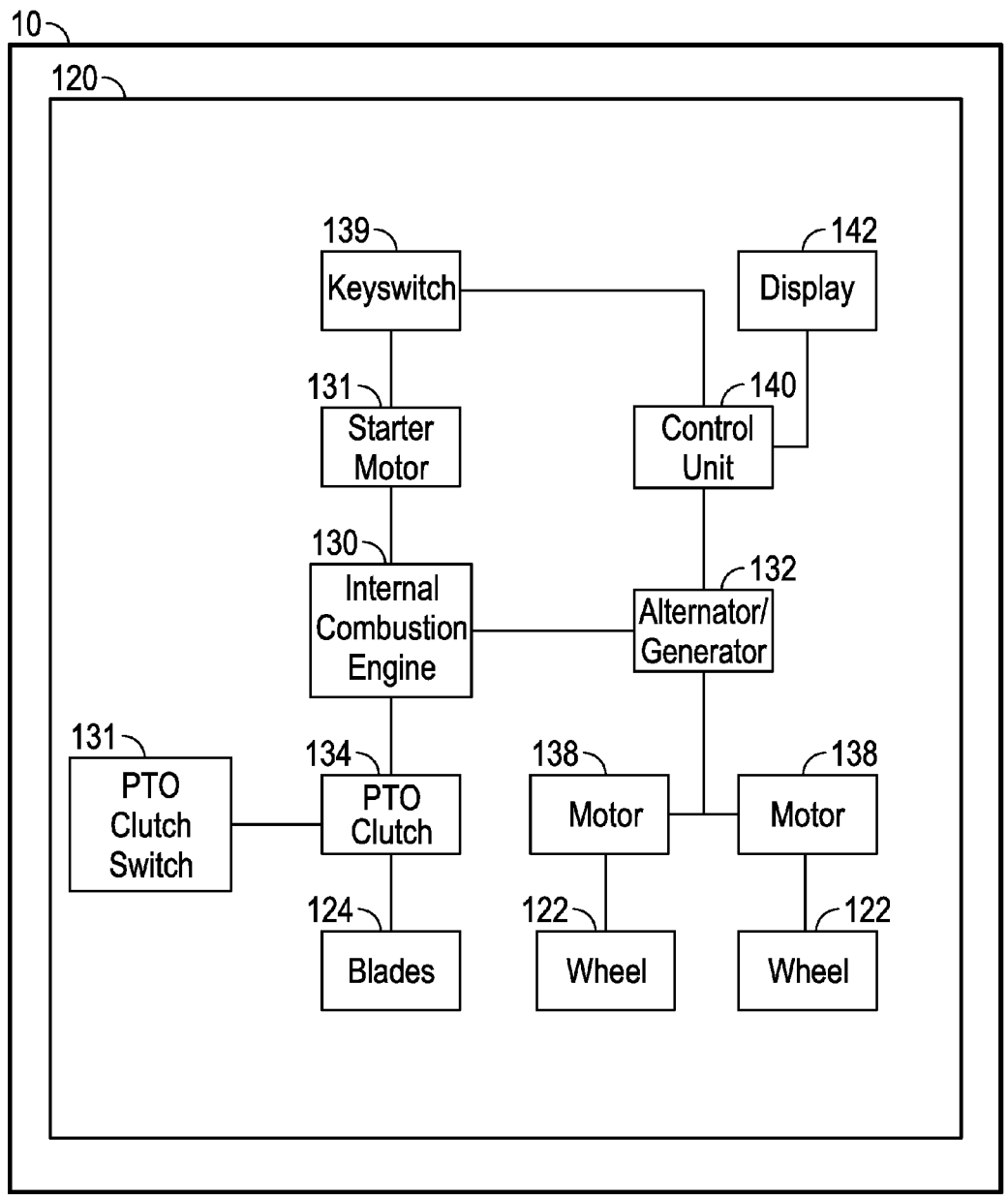
FIG. 3 is a schematic block diagram of a hybrid drive system for a lawn tractor, according to another exemplary embodiment.

Referring now to FIG. 3, a schematic block diagram of a hybrid drive system 120 for a vehicle 10 such as a lawn tractor is shown according to another exemplary embodiment. Similar to the drive system 20 described above, the drive system 120 provides power to a pair of drive wheels 122 to propel the vehicle 10 and provides power to an accessory such as rotating blades 124.

The hybrid drive system 120 includes an engine 130 that is coupled to the blades 124 via a PTO clutch 134. The engine 130 is further coupled to a device such as an alternator or under-flywheel generator 132 that is configured to convert rotational mechanical energy to electrical energy. The electrical energy from the generator 132 is utilized to operate an electric motor 138 coupled to the wheel 122 to propel the vehicle 10. An intermediate device such as a gear reduction may be provided between the motors 138 and the wheels 122. In this way the electric propulsion drive is isolated from the internal combustion drive used to power the blades 124. The hybrid system 120 further includes a control unit 140 and a display 142.

No on-board electrical power storage system is needed for the motors 138, reducing the weight, cost, and complexity of the hybrid drive system 120. Optionally, a battery system may be provided to allow for operation of the electric drive system without running the engine 130. If an optional battery system is provided, a control system similar to that described with respect to the system 20 in FIG. 1 may be utilized. For example, the wheels may be operated in an all-electric mode and the alternator/generator may be selectively operated to recharge the battery (e.g., at 80% DOD).

According to an exemplary embodiment, the hybrid drive system 120 includes hub motors for each of the driven wheels 122. Each of the hub motors 138 is powered by the generator 132 and is able to move independently with the associated wheel 122. In this way, the motors 138 and the wheels 122 do not need to be coupled to a solid axle. Instead, an independent suspension system may be provided for each set of hub motors 138 and wheels 122, improving the comfort of the user.

A user may start the engine 130 via a user interface, such as a keyswitch 139 or another suitable device, such as a pushbutton, a toggle switch, etc. The keyswitch activates a starter motor 131. In some embodiments, the engine 130 can be started by the alternator/generator 132 in place of a starter motor 131. The engine 130 powers the motors 138 via the generator 132 to propel the vehicle 10. The user activates the blades 124 by engaging the PTO clutch 134 with a PTO clutch switch 131 (e.g., push button, toggle switch, lever, etc.). The user may press the switch 131 again to disengage the PTO clutch 134 and deactivate the blades 124. In one embodiment, turning off the vehicle 10 (e.g., by turning the keyswitch 139 off), both turns off the engine 130 and resets the PTO clutch switch 131 to the off position, disengaging the PTO clutch 134, and deactivating blades 124. In this way, when the vehicle 10 is turned back on using the keyswitch 139, the blades 124 do not automatically activate.

Figure 4:
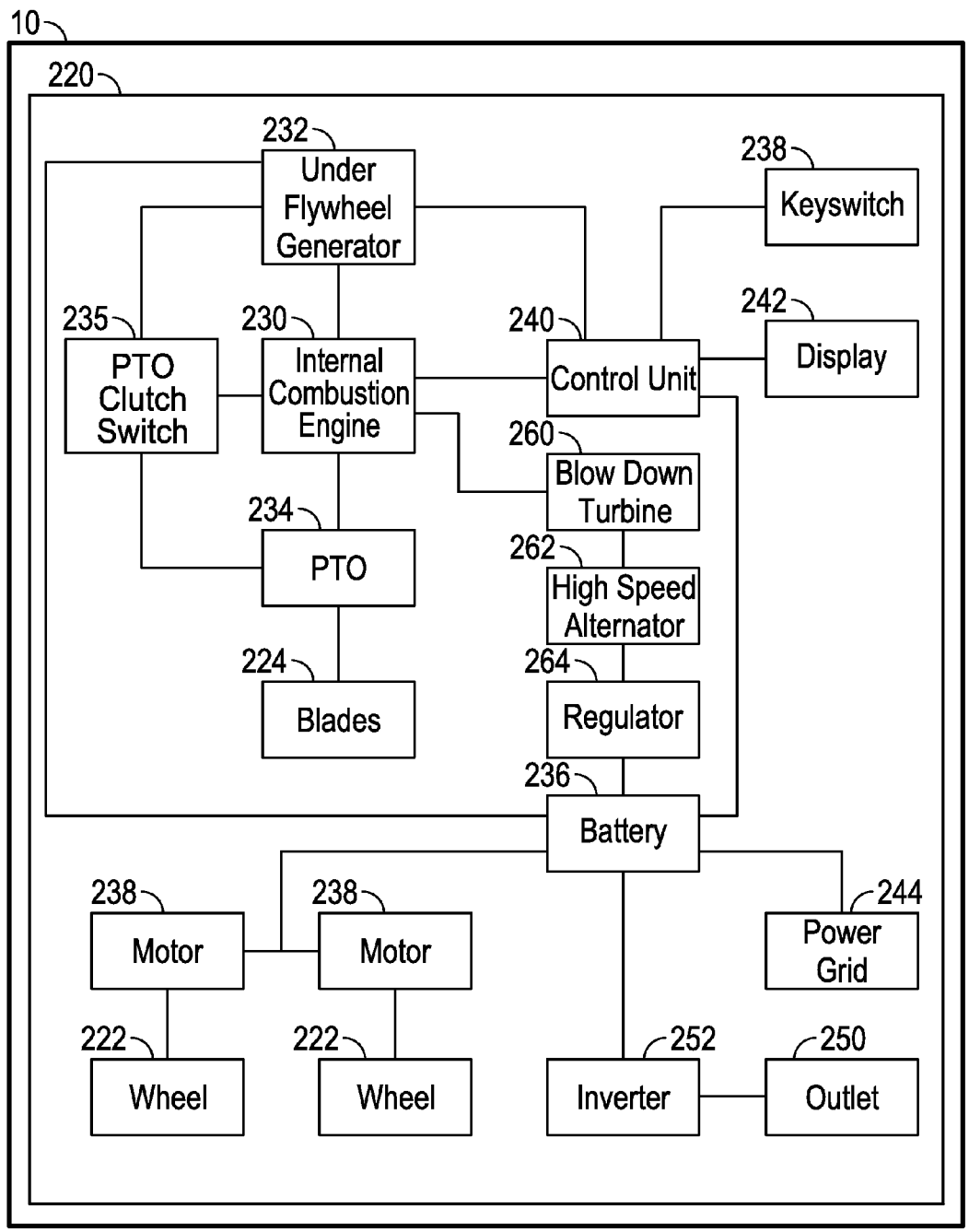
FIG. 4 is a schematic block diagram of a hybrid drive system for a lawn tractor, according to another exemplary embodiment.

Referring now to FIG. 4, a schematic block diagram of a hybrid drive system 220 for a vehicle 10 such as a lawn tractor is shown according to another exemplary embodiment. The hybrid drive system 220 includes an engine 230 that is coupled to the blades 224 via a device such as a PTO clutch 234. The engine 230 is further coupled to an under-flywheel generator (UFG) 232. The UFG 232 is operated as a motor to convert electrical energy to rotational mechanical energy that is applied to the crankshaft of the engine 230. A battery system including a battery 236 and components such as a control unit 240 and a display 242 may be provided, as described in reference to the drive system 120 above.

The control unit 240 may monitor the rotational speed of the blades 224. If the rotational speed of the blades 224 decreases (e.g., because of wet or dense grass), the control unit 240 may be selectively utilized to activate the UFG 232 to aid in the operation of the blades 224 to maintain a certain rotational speed. The UFG 232 may also be utilized to add power to the crankshaft at other times to aid in the operation of the blades 224. The power provided by the UFG 232 reduces the power output needed from the engine 230, reducing the amount of fuel that is needed for the operation of the hybrid drive system 220 and allows for noise reduction through the use of a smaller engine.

According to an exemplary embodiment, the engine 230 may be started and run in an idle mode. With the blades 224 not engaged, the engine may continue to operate in an idle mode as the UFG 232 provides power to the crankshaft of the engine 230 and, in turn, to the wheels 222 to propel the vehicle 10. If additional power is needed for the wheels 222 (e.g., when going up hill, when towing a heavy load, etc.), the engine 230 may be throttled up to aid the UFG 232 to propel the vehicle 10. According to another exemplary embodiment, the UFG 232 may be utilized to recharge the battery 236 to extend the run time of the vehicle 10.

According to another exemplary embodiment, the control unit 240 monitors the SOC and DOD of the battery 236. If the DOD of the battery exceeds a predetermined level (e.g., 50% DOD), the control unit 240 may be utilized to deactivate the UFG 232. The display 242 may include a warning to indicate to the user of the vehicle 10 that the battery 236 has a low SOC and should be recharged. Such a warning may be a text warning, an icon, a flashing light, or an audio warning.

According to an exemplary embodiment, the hybrid drive system 220 of the vehicle 10 may be utilized as an emergency generator. The engine 230 consumes fuel such as gasoline and converts chemical energy to mechanical energy and the UFG 232 converts the mechanical energy into electrical energy. An inverter 252 converts the operational voltage of the hybrid drive system (e.g., 60-Volts DC) to an appropriate voltage (e.g., 120-Volts root-mean-square, 60-Hertz AC as is commonly utilized by household appliances and devices), and provides that power via one or more outlets 250. If the fuel supply is exhausted, energy stored in the battery 236 may be utilized to provide additional power to the appliances or devices via the outlets 250.

According to another exemplary embodiment, the hybrid vehicle drive system 220 may be configured to have electrical turbo compounding capabilities. As shown in FIG. 4, hybrid vehicle drive system 220 includes a blow down turbine 260 to recapture some of the energy from the exhaust gasses from the engine 230. The exhaust gasses from the engine 230 expand through the blow down turbine 260, turning the turbine 260 which then turns a high speed alternator 262. Electrical power from the high speed alternator 262 is routed to the battery 236 via a regulator 264. The control unit 240 may monitor the battery 236, the engine 230, and the UFG 232. The control unit 240 may control the power routing between the battery 236 and the UFG 232 based on various factors, such as the SOC of the battery 236 and the needs of the engine 230.

Figure 5:
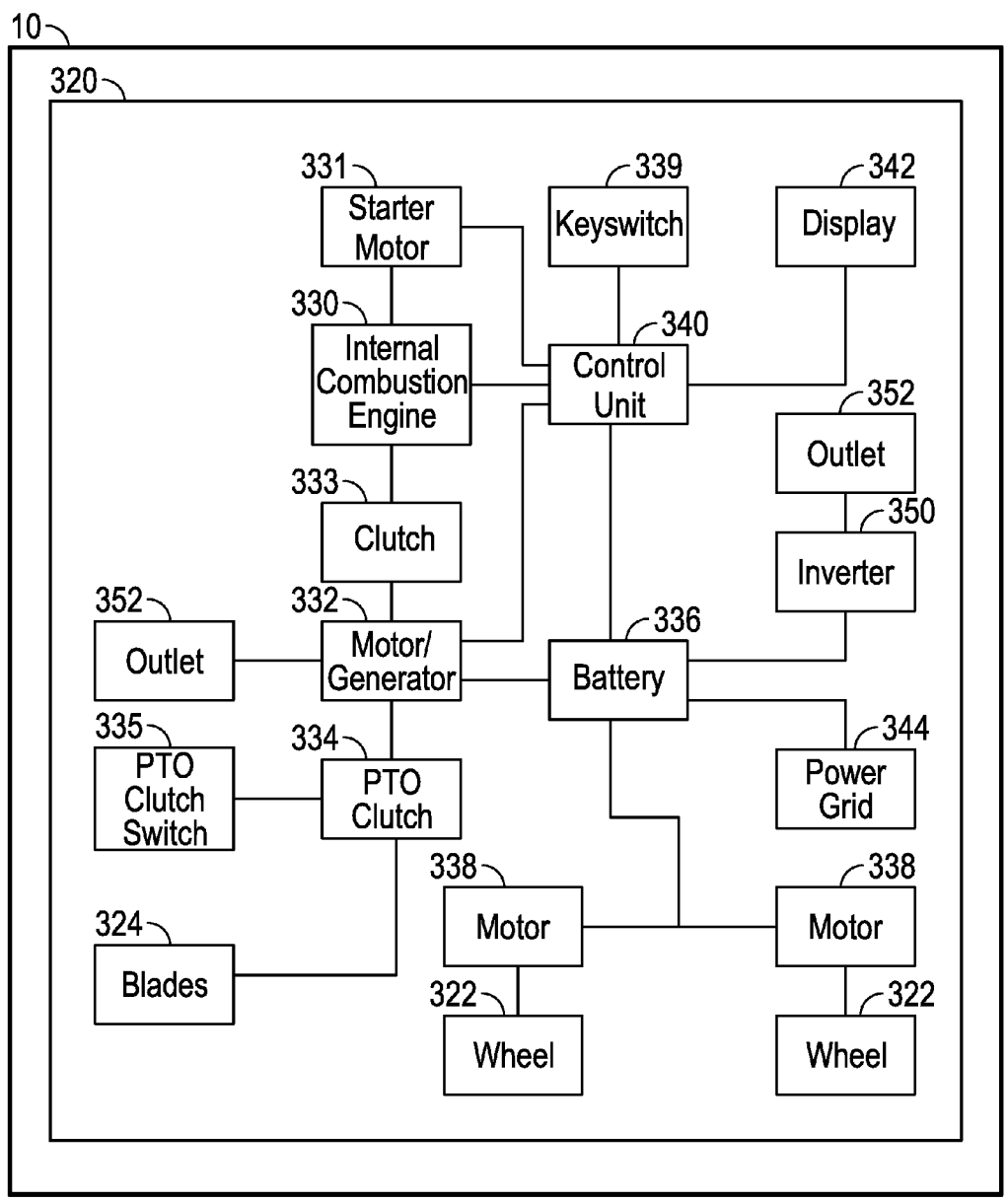
FIG. 5 is a schematic block diagram of a hybrid drive system for a lawn tractor, according to another exemplary embodiment.

Referring now to FIG. 5, a schematic block diagram of a hybrid drive system 320 for a vehicle 10 such as a lawn tractor is shown according to another exemplary embodiment. Similar to the drive systems 20, 120 and 220 described above, the drive system 320 provides power to drive at least one drive wheel 322 to propel the vehicle 10 and provides power to an implement or accessory (e.g., one or more rotating blades 324). In one embodiment, the hybrid drive system 320 is configured for outdoor power equipment (e.g., a lawn tractor, a riding lawn mower, a walk behind mower, a stand-on mower, a zero-turn radius vehicle or mower, a snowthrower, a cultivator, etc.). In other embodiments, the hybrid drive system may be configured for another vehicle, such as a tractor, an ATV, a golf cart, a motorcycle, etc.

The hybrid drive system 320 is a parallel hybrid system including an engine 330 (e.g., a vertical shaft engine) that is coupled to a motor/generator 332 with an engine clutch 333 (e.g., a freewheeling-type clutch, overrunning clutch, slipper clutch, Sprague clutch, electric clutch, etc.). For some embodiments using an electric clutch, the starter motor 331 is not required and the motor/generator 332 is instead used to start the engine 330. The clutch 333 allows the motor/generator 332 to operate independently of the engine 330. The motor/generator 332 is configured to convert mechanical energy to electrical energy in a generator mode and to covert electrical energy to mechanical energy in a motor mode. According to an exemplary embodiment, the motor/generator 332 may be a pancake permanent magnet motor.

The electrical power from the motor/generator 332 is utilized to operate a motor 338 configured to drive a wheel 322 to propel the vehicle 10. The motor 338 can be an electric motor that drives the wheel 322 or a component of a hydraulic or hydrostatic drive system that drives the motor. An intermediate device such as a gear reduction or transmission may be provided between the motor 338 and the wheel 322. Each wheel 322 may be driven by a separate motor 338 so that the motors 338 can be operated independently to turn the wheels 322 in either a forward or reverse direction, allowing the vehicle 10 to have zero-radius turn capabilities. In some embodiments, the motor/generator 332 is coupled to a hydraulic or hydrostatic drive, thereby eliminating the wheel motor 338. A belt and pulley system could be used to connect the motor/generator 332 to the hydraulic or hydrostatic drive. The motor/generator 332 is further utilized to power one or more blades 324 through a PTO clutch 334. According to various exemplary embodiments, the PTO clutch 334 may be an electric clutch or selectively engaged pulley (e.g., a pulley moved by a solenoid). The PTO clutch 334 may be coupled to the blades 324 via a v-belt.

The drive system 320 further includes a battery system with an energy storage device (e.g., battery 336) to allow for operation of the electric drive system without running the engine 330. The motor/generator 332 and the wheel motors 338 may draw power from the battery 336. The battery 336 may be recharged either from an external power grid 344 or from the motor/generator 332 being driven by the engine 330.

In an all electric mode of operation, the drive system 320 may be activated by a user via a user interface, such as a keyswitch 339 or another suitable device, such as a pushbutton, a toggle switch, etc. A control unit 340 operates the motors 338 to drive the wheels 322 and the motor/generator 332 to drive the blades 324 through the PTO clutch 334. The engine 330 remains idle and the motors 332 and 338 consume electrical power from the battery 336. In such an all electric mode, the blade speed 324 may be adjusted by varying the speed of the motor/generator 332. The status of the vehicle 10 or various components of the vehicle 10 (e.g., implement speed, wheel speed, SOC of the energy storage device, DOD of the energy storage device, all electric mode, hybrid mode, other operating modes or conditions, etc.) can be displayed on a display 342 controlled by the control unit 340.

Figure 6:
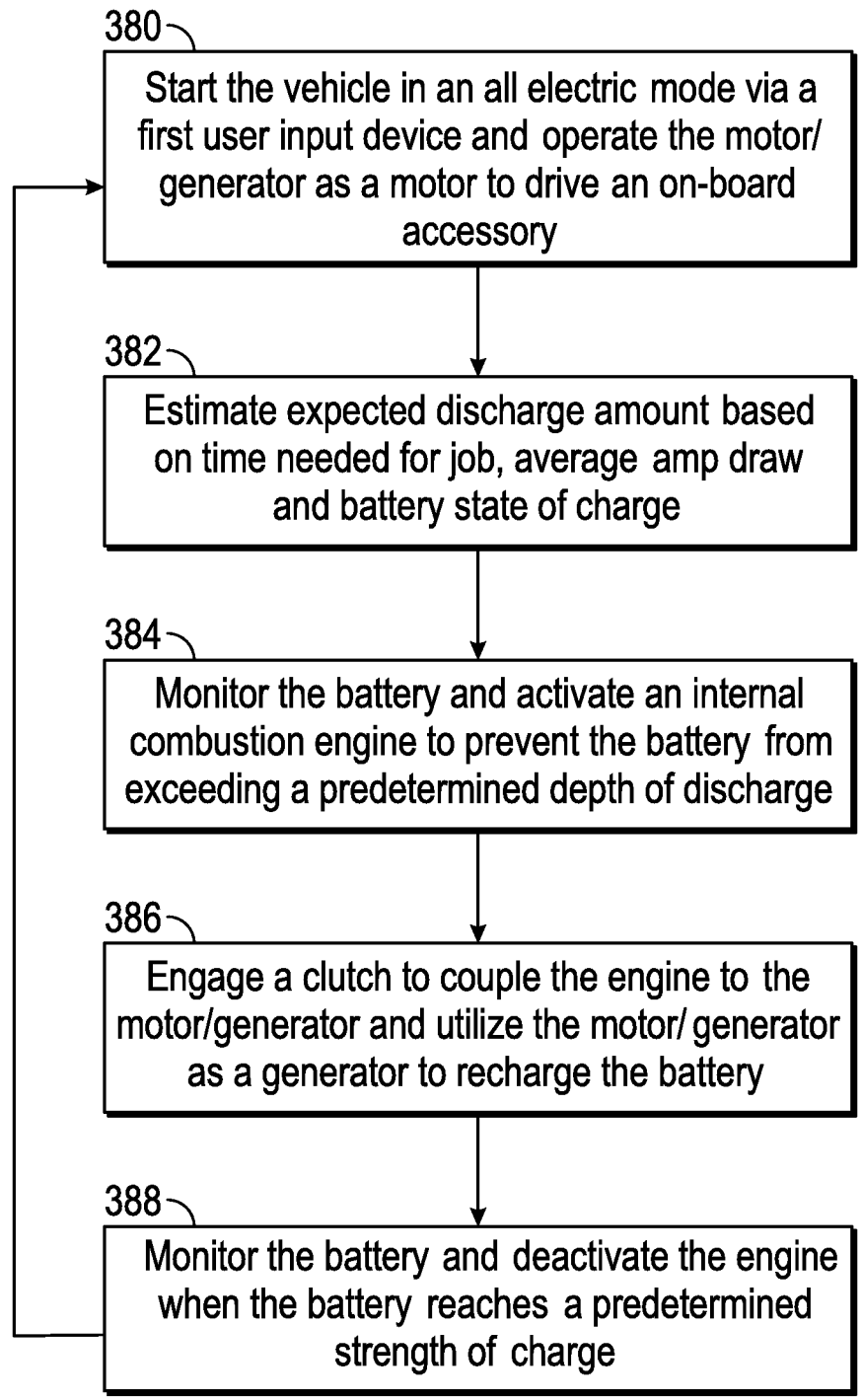
FIG. 6 is a flowchart of a method for operating the hybrid vehicle drive system of FIG. 5 in a first hybrid mode, according to an exemplary embodiment.

Referring to FIGS. 5 and 6, in a first hybrid mode of operation (i.e., a range extending mode), the drive system 320 begins in an all-electric mode, as described above (step 380). According to an exemplary embodiment, the user may input an expected time needed to complete a task with the vehicle 10. The time may be estimated, for example, based on past history. For example, the user may know that it takes him 30 minutes to mow his front yard and 90 minutes to mow both his front yard and his back yard. Based on the estimated time needed, the charge of the battery 336, and an expected current draw on the battery 336 or an expected rate of discharge of the battery 336, an expected discharge may be estimated (step 382). If the task can be completed without exceeding a predetermined DOD, the drive system 320 can continue to operate in an all-electric mode without activating the engine 330.

If the task cannot be completed using only energy stored in the battery 336, the control unit 340 may monitor the battery 336 and activate the engine 330 (via a starter motor 331) such that the battery will not exceed a predetermined percentage DOD (step 384). The percentage DOD at which the drive system 320 is converted from an all-electric mode to a recharge mode may be calculated in a variety of ways. According to one exemplary embodiment, the engine is activated based on a given recharge rate that will allow the task to be completed in the estimated time needed without the battery 336 exceeding an 80% DOD. At or just before an 80% DOD, the engine 330 is then started with an idle down engaged until the engine 330 is warm. In one embodiment, an idle down is utilized to prevent the engine from engaging the blades through the clutch 333 by rotating the engine output shaft at a slower rotational speed than the output shaft of the motor/generator 332.

Once the engine is warmed up, the clutch 333 is engaged such that the engine 330 drives the motor/generator 332 in a generator mode to recharge the battery 336 and drives the blades 324 through the PTO clutch 334 (step 386). Alternatively, the engine 330 is started by engaging the clutch 333 and using the motor/generator 332 as a motor to start the engine 330. The system 320 may operate in this first hybrid mode until the battery 336 has reached a predetermined DOD (e.g., a "fully charged" DOD of approximately 20%). The longer the estimated cut time and the higher the load on the drive system 320, the sooner the engine 330 is activated and the longer it is operated to recharge the battery 336. Conversely, if either the cut time or the load are reduced, the percentage of time during which the drive system 320 is operated in an all-electric mode is increased.

If the drive system 320 is configured for maximum range, the control unit 340 may allow the battery 336 to discharge to 50-70% DOD before activating the engine 330. For example, the engine 330 may be activated at a higher DOD (e.g., approximately 70% DOD) if the load on the battery 336 is relatively low and at a lower DOD (e.g., approximately 50% DOD) if the load on the battery 336 is relatively high. If the recharge rate (e.g., the rate at which the battery DOD decreases due to energy from the generator 332) is less than the discharge rate (e.g., the rate at which the battery DOD increases due to energy drawn by the motors 338, the blades 324, and other loads), the engine 330 may be operated until the drive system 320 is turned off. If the recharge rate is greater than the discharge rate, the engine 330 may be operated until the SOC of the battery 336 reaches a predetermined SOC. According to an exemplary embodiment, the engine 330 may be operated until the battery reaches a SOC of 80%.

If the battery 336 reaches the predetermined SOC, the engine 330 is shut off, the motor/generator 332 switches back to a motor mode, and the system 320 operates in an all electric mode of operation (step 388). With the engine 330 shut off, the blade speed 324 may be adjusted by varying the speed of the motor/generator 332. If the engine 330 is running, the blade speed is dictated by the governed speed of the engine 330.

Figure 7:
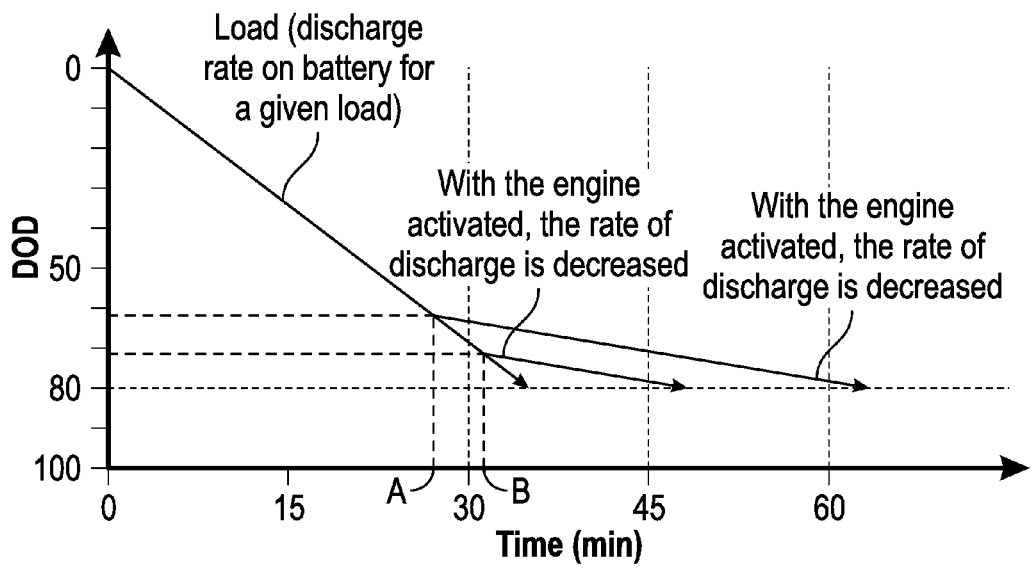
FIG. 7 is a graph of an exemplary discharge cycle for a battery for a system with a single recharge rate.

If the engine is operated such that the generator 332 recharges the battery 336 at a single recharge rate, the point (e.g., value of SOC or DOD) at which the engine 330 is activated may vary based on the estimated time to complete the task. Referring to FIG. 7, a graph of an exemplary discharge cycle for a battery is shown for a system with a single recharge rate. If the selected or estimated run time is 30 minutes, the engine does not need to be activated and the drive system is able to operate in an all-electric mode and complete the task (i.e. with the discharge rate at the given load) within 30 minutes before reaching an 80% DOD. If the selected or estimated run time is 45 minutes, the drive system is unable to complete the task in an all electric mode or first operating condition. Instead, the engine is activated as described above at a time B before an 80% DOD. With the engine activated and the generator recharging the battery in a hybrid mode or second operating condition, the rate of discharge (i.e., the rate of change of the SOC or DOD) is decreased and the task may be completed within 45 minutes before reaching an 80% DOD. Likewise, if the selected or estimated run time is 60 minutes, the drive system is unable to complete the task in an all electric mode and the engine is activated as described above. Because the generator recharges the battery as a single recharge rate, the engine is activated at a time A earlier than time B such that the task may be completed within 60 minutes before reaching an 80% DOD. Alternatively, the hybrid mode or second operating condition can be implemented in response to the SOC or DOD reaching a predetermined amount or state (e.g., 80% SOC, 75% SOC, 20% DOD, 25% DOD) or in response to an increase in load on the implement (e.g., a blade cutting heavy or wet grass and "bogging" down).

Using an electronically controlled governor system, the engine 330 may be operated at multiple engine speeds for multiple recharge rates and thereby vary the discharge rate of the battery as a function of varying engine speed. At a low recharge rate, the engine 330 can be operated at lower speeds, reducing NVH levels. At a higher recharge rate, the engine 330 is operated at higher speeds, increasing NVH levels. The properties of the output (e.g., voltage, frequency, etc.) from the generator may be adjusted at various engine speeds to provide usable power to the battery 336 and motors 338.

Figure 8:
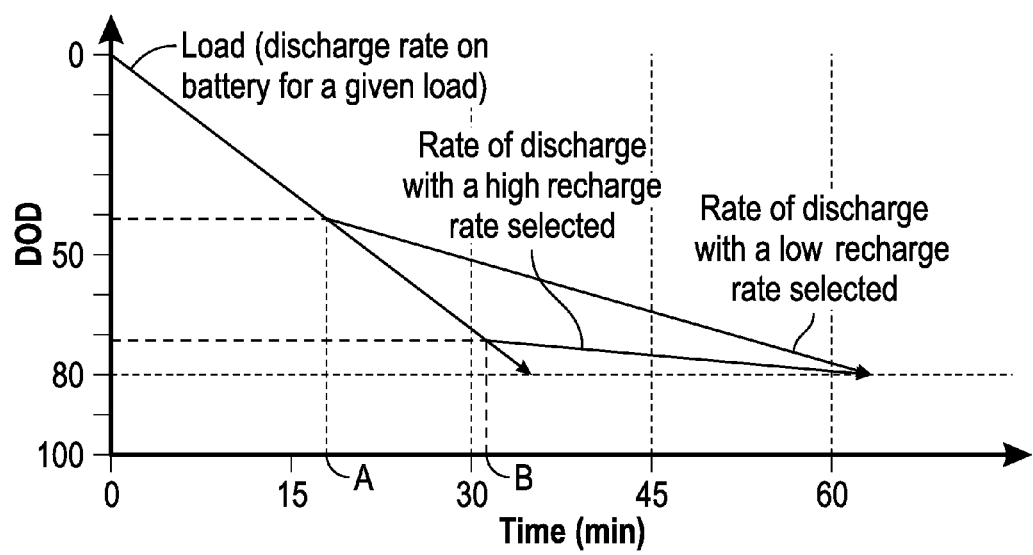
FIG. 8 is a graph of an exemplary discharge cycle for a battery for a system with multiple recharge rates.

Referring to FIG. 8, a graph of an exemplary discharge cycle for a battery is shown for a system with multiple recharge rates. If the selected or estimated run time is 60 minutes and the drive system is unable to complete the task in an all-electric mode, the engine may be activated at different times depending on whether a high recharge rate or a low recharge rate is selected. At a low recharge rate, the engine is activated earlier, at a time A, such that the task may be completed within 60 minutes before reaching an 80% DOD. With a low recharge rate, the drive system operates in an all-electric mode for a shorter duration, but the engine is operated at a lower speed, reducing NVH levels. At a high recharge rate, the engine is activated later, at a time B, such that the task may be completed within 60 minutes before reaching an 80% DOD. With a high recharge rate, the drive system operates in an all-electric mode for a longer duration, but the engine is operated at a higher speed, increasing NVH levels.

The hybrid drive system 320 may further be operated in a generator mode. In a generator mode, the PTO clutch 334 is disengaged and the motors 338 are disabled to leave the vehicle 10 stationary. The engine 330 is started and the clutch 333 is engaged. The motor/generator 332 is operated as a generator to provide electrical power to an on-board outlet 352 (e.g., at 110V AC). As shown in FIG. 5, the outlet 352 may draw power from the battery 336 through an inverter 350. In other embodiments, the outlet 352 may be electrically coupled directly to the motor/generator 332. In other embodiments, the motor/generator 332 and the battery 336 may be both coupled to the outlet 352 and the battery 336 may be utilized as an additional power source or to level the load on the motor/generator 332.

The hybrid drive system 320 may be configured to be operated in an economy mode, a performance mode, or a normal mode to regulate the power consumption of the drive system 320 and extend the amount of time in which the drive system 320 is in an all-electric mode. The economy mode is configured to regulate the power consumption to help extend the amount of time the hybrid drive system operates in an all-electric mode. The performance mode is configured to maintain the quality of cut. In both the economy mode and the performance mode, the total load on the battery or total electric load is continuously monitored while the vehicle is in operation (e.g., by control unit 340). The normal mode is configured to utilize an uncontrolled rate of discharge with the user specifying only the desired ground speed and blade speed.

In the economy mode, the wheel speed (i.e., vehicle speed, ground speed, etc.) is limited when the blades are engaged (e.g., limited to a range between 2.5 mph and 4 mph). The blade speed may also be limited based on the size of the blades and the amount of blade lift (e.g., limited to between 2000 rpm and 2500 rpm). In the economy mode, the total electrical load is regulated. For example, the hybrid drive system may operate with an upper target limit of 40 amps on the battery. In other exemplary embodiments, the limit for the electrical load may be in terms of power (i.e. watts). The load is measured as a running average over a period of time (e.g., 1, 2, 5, or 10 seconds, etc.). The hybrid drive system may operate above the upper target limit, but the control unit (e.g., a PI controller, a PID controller, etc.) is utilized to adjust the operating parameters of the hybrid drive system to stay below the upper target limit.

If the hybrid drive operates above the upper target limit for a predetermined length of time, the control unit first reduces the blade speed. Because the operation of the blades represents the largest amount of power draw, reducing the speed of the blades in turn results in a large effect on total power draw. Similarly, if the hybrid vehicle drive with an economy mode is utilized for another type of equipment or vehicle, the control unit may be utilized to reduce the power draw of the largest power consumer to reduce to overall power draw of the drive system. The control unit first reduces the blade speed by a predetermined amount over a desired time interval. If the speed reduction does not reduce the load below the upper target limit, the control unit further reduces the blade speed. The blade speed is decreased until the load is reduced below the upper target limit or the blade speed is reduced to a predetermined lower limit (e.g., 2000 rpm). If blade speed is reduced to the lower limit and the load is still above the upper target limit the control unit next reduces the ground speed of the vehicle in a similar manner until the total load is reduced below the upper target limit or the ground speed is reduced to a predetermined lower limit (e.g., 2.5 mph). If the system is operating with reduced blade speed and/or reduced ground speed, the control unit may be utilized to gradually increase first the ground speed and then the blade speed until the total load approaches the upper target limit.

The user retains control of vehicle speed using the foot pedal in the economy mode and the normal mode. The control unit is configured to reduce the ground speed of the vehicle only if the pedal position is in a predetermined range (e.g., between 75% and 100%). If the pedal position is below the lower limit of the predetermined range, the ground speed is determined by the percent difference between the top governed speed and a full stop. Further, the ground speed is not governed when the vehicle is in reverse.

Figure 9:
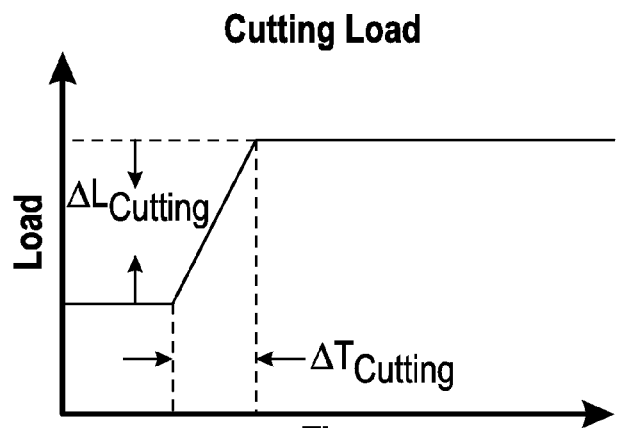
FIG. 9 is a graph of an increasing cutting load over time, according to an exemplary embodiment.
Figure 10:
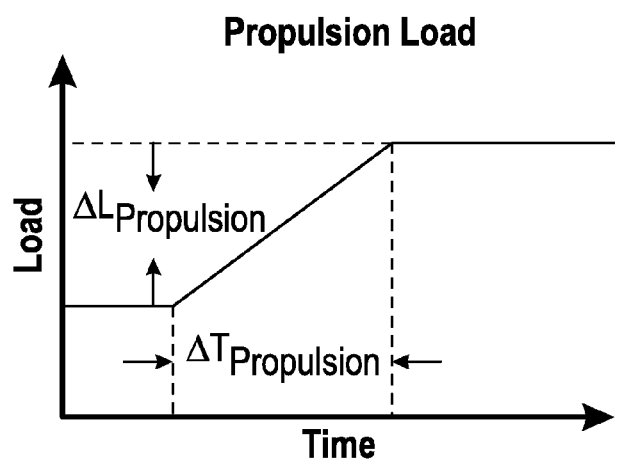
FIG. 10 is a graph of an increasing propulsion load over time, according to an exemplary embodiment.

The control unit may further distinguish between increased loads resulting from heavy cutting operations and increased loads resulting from propulsion (e.g., driving up a hill). Referring to FIGS. 9 and 10, it is believed that a cutting load has a higher slope than a propulsion load (i.e., a cutting load will increase more quickly than a propulsion load with an equal magnitude). According to an exemplary embodiment, the load of the propulsion motor or the average of independent hub motors may be monitored in addition to the total load. In this way, it can be determined how much of the total load is propulsion load if the propulsion load and the cutting load increase at the same time.

In the performance mode, the wheel speed (i.e., vehicle speed, ground speed, etc.) is unlimited and is determined on the user preference by depressing the foot pedal. The blade speed may be limited (e.g., limited to between 2500 rpm and 3000 rpm). In the performance mode, the total electrical load or the total load and the propulsion load are regulated. The load is measured as a running average over a period of time (e.g., 1, 2, 5, or 10 seconds, etc.). Instead of using a set upper limit, the control unit monitors the rate (i.e., slope) of the load increase.

If an increased cutting load (such as shown in FIG. 9) is detected, the wheel speed may be reduced to maintain cutting performance by reducing the likelihood that the blades will be overloaded and stall. The hybrid drive system may have a minimum speed that will be maintained, regardless of cutting load (e.g., 2.5 mph). As described above in reference to the economy mode, the wheel speed is reduced incrementally until the cutting load is stabilized. If reducing the wheel speed does not stabilize the cutting load, the blade speed may be adjusted as described above until the cutting load is stabilized or a minimum specified blade speed is reached.

Figure 11:
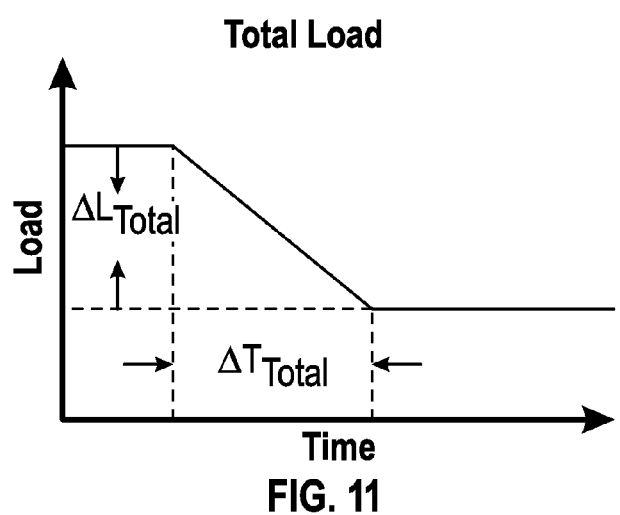
FIG. 11 is a graph of a decreasing cutting load over time, according to an exemplary embodiment.

Referring to FIG. 11, if a negative cutting load slope is detected over a period of time, the blade speed and the wheel speed are adjusted to stabilize the cutting load. According to an exemplary embodiment, the control unit may be utilized to gradually increase first the blade speed and then the wheel speed until the load stabilizes. A negative slope (e.g., a drop of more than 15-20 amps) or a load exceeding a predetermined limit (e.g., 40 amps) may be interpreted as a potential stall. If a potential stall is detected the vehicle may be stopped completely in an effort to clear grass and prevent the blades from stalling.

In the normal mode, the user may predefine the blade speed (i.e., as allowed by the control unit), and select the ground speed by utilizing the foot pedal. The hybrid drive system may attempt to maintain the desired blade speed, but allow the blade speed to vary based on load. The selected blade speed is therefore a maximum limit for the blade speed.

Figure 12:
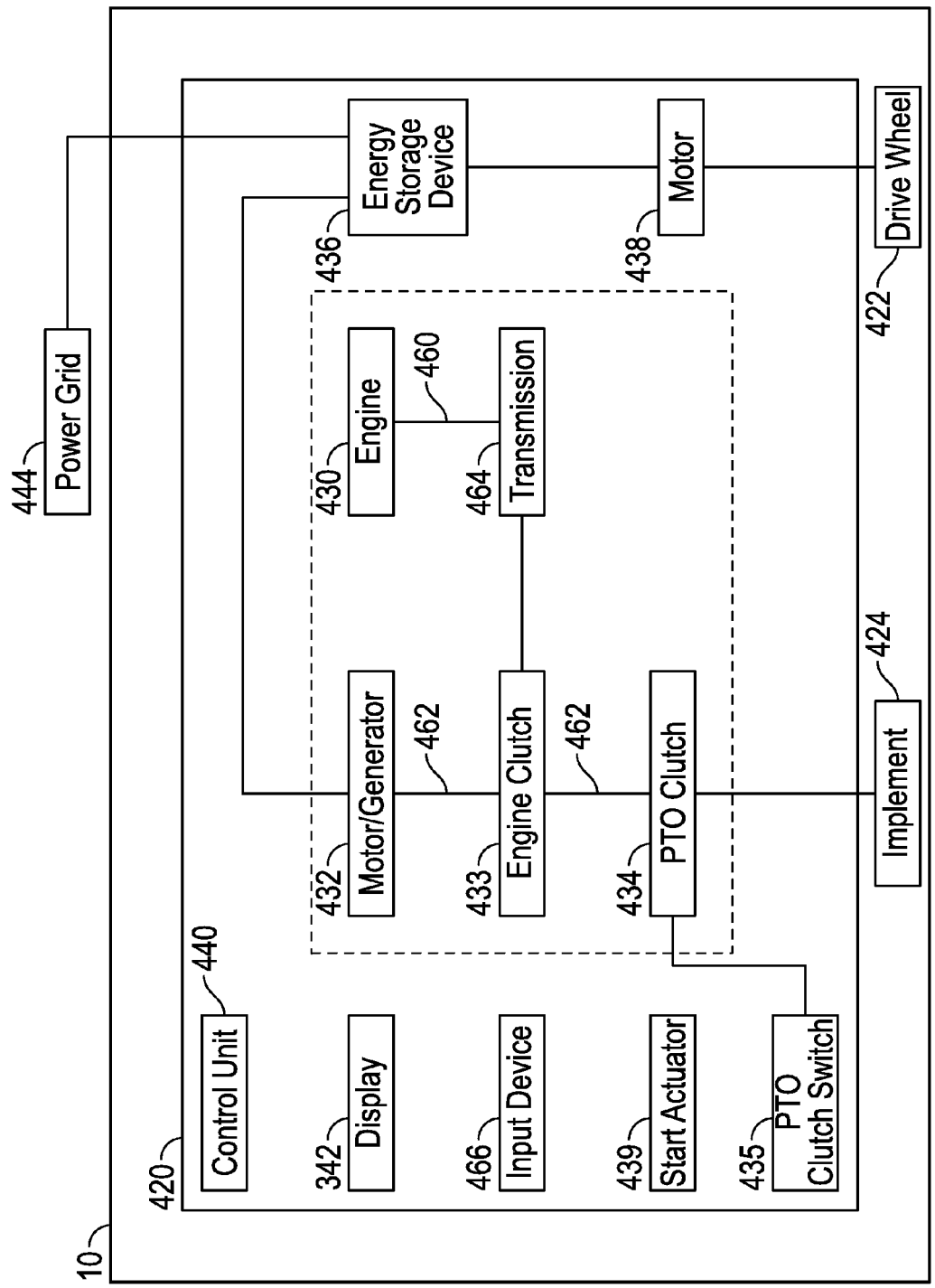
FIG. 12 is a schematic block diagram of a hybrid drive system for outdoor power equipment, according to an exemplary embodiment.

Referring to FIG. 12, a schematic block diagram of a hybrid drive system 420 for outdoor power equipment 10 is shown according to an exemplary embodiment. Drive system 420 is similar to drive systems 20, 120, 220, and 320 described above.

Outdoor power equipment 10 includes an internal combustion engine 430 including an output shaft 460, an energy storage device 436, a motor/generator 432 including an output shaft 462, an implement 424 (e.g., one or more cutting blades, an auger, a tiller, a snow thrower, a brush, a reel mower, etc.), a drive wheel 422 driven by a motor 438, and an energy storage device 436. Outdoor power equipment 10 also includes more than one drive wheel 422. The multiple drive wheels 422 may be driven by a single motor 438, or each drive wheel 422 may be driven by a dedicated motor 438. Outdoor power equipment 10 may also include one or more free-wheeling or caster wheels. In some embodiments, the drive wheel 422 is a tread or other device capable of moving the outdoor power equipment 10. In some embodiments, the drive wheel 422 is driven by a hydraulic transmission (e.g., a hydrostatic transmission) driven by the motor/generator output shaft 462 and the motor 438 powered by the energy storage device 436 can be eliminated.

The motor/generator 432 can be operated as a motor powered by the energy storage device 436 and as a generator to provide power to the energy storage device 436. Additionally, power may be provided to the energy storage device from a power grid 444 (e.g., by plugging into a residential power supply). The energy storage device 436 is coupled to the motor 438 to drive the motor 438, which in turn drives the drive wheel 422. An engine coupling 433 selectively engages the engine output shaft 460 with the motor/generator output shaft 462, thereby coupling and decoupling the engine 433 from the motor/generator output shaft 462 as needed. In some embodiments, the engine coupling 433 is a clutch (e.g., a freewheeling-type clutch, overrunning clutch, slipper clutch, Sprague clutch, electric clutch, etc.). In some embodiments, the engine coupling is an idler pulley and belt assembly selectively tensioned by a actuator (e.g. a linear actuator) that disengages by reducing tension on the belt (e.g., allowing the belt to slip) and engages by tensioning the belt (e.g., causing the belt to transfer power). In some embodiments, the engine coupling 433 includes a continuously variable transmission (CVT) so that the engine speed can be optimized (e.g., for NVH) relative to a desired motor/generator output shaft 462 or implement 424 speed (e.g., 1200 rpm, 1400, rpm, 1600 rpm, 1800 rpm, 2000 rpm, etc.). With the engine coupling 433 disengaged and the motor/generator 432 operating as a motor, the motor/generator 432 drives the motor/generator output shaft 462. With the engine coupling 433 engaged, the engine 430 on, and the motor/generator 432 operating as a motor, either the engine 430 or both the motor/generator 433 and the engine 430 drive the motor/generator output shaft 462. In some embodiments, with the motor/generator 432 operating as a motor, the motor/generator functions as a source of reserve power to be added to the power provide by the engine 430 to maintain a constant motor/generator output shaft 462 speed even under increasing loads (e.g., heavy cutting conditions). In this way, power from the motor/generator 432 operating as a motor is provided to the motor/generator output shaft 462 as the engine 430 reaches or approaches the maximum power it can provide (e.g., as the engine throttle position reaches or approaches the wide open throttle position). With the engine coupling 433 engaged, the engine 430 on, and the motor/generator 432 operating as a generator, the engine 430 drives the motor/generator output shaft 462. In some embodiments a transmission 464 (e.g., a belt and pulley system) couples the engine output shaft 460 to the engine coupling 433. In some embodiments, the engine 430 is started by a starter motor. In other embodiments, the engine 430 is started by the motor/generator 432.

A PTO clutch 434 selectively couples the implement 424 to the motor/generator output shaft 462 to drive the implement 424. With the PTO clutch 434 engaged, the motor/generator output shaft 462 drives the implement 424. With the PTO clutch 434 disengaged, the implement 424 is not driven. A PTO clutch switch or actuator 435 provides a user interface for the user to engage and disengage the implement 424 by causing the PTO clutch to engage and disengage. The PTO clutch 434 may also be engaged and disengaged in response to signals from a control unit 440 in response to operating conditions or inputs from other components of the outdoor power equipment 10 (e.g., to disengage the PTO clutch 434 at a predetermined SOC or DOD of the energy storage device 436). The control unit 440 is configured to implement the various operating conditions and modes described below, and to receive other inputs and provide other outputs as necessary to operate the outdoor power equipment 10 as described. One or more input devices 466 (e.g., switches, actuators, keypads, buttons, touch screens, etc.) allow the user to make inputs to the control unit 440.

The control unit 440 includes a controller or processing circuit. A processing circuit can include a processor and memory device. Processor can be implemented as a general purpose processor, an application specific integrated circuit (ASIC), one or more field programmable gate arrays (FPGAs), a group of processing components, or other suitable electronic processing components. Memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. Memory device may be or include volatile memory or non-volatile memory. Memory device may include database components, object code components, script components, or any other type of information structure for supporting the various activities and information structures described in the present application. According to an exemplary embodiment, memory device is communicably connected to processor via processing circuit and includes computer code for executing (e.g., by processing circuit and/or processor) one or more processes described herein.

In some embodiments, the drive system 420 is activated when the user actuates a start actuator 439 (e.g., a keyswitch, a push button, a key fob, etc.). In some embodiments, the drive system 420 begins operation in an all electric drive mode where the engine 430 does not start when the start actuator 439 is actuated and the PTO clutch 434 is disengaged so that the implement 424 is not driven. In the all electric drive mode, the outdoor power equipment can be driven, but the implement 424 is not engaged and the engine is off. After the drive system 420 is activated, the user can actuate the PTO clutch switch 435 to engage the implement 424 and place the drive system 420 into an all electric mode with the implement engaged, in which the outdoor power equipment can be driven with the implement 424 engaged and the engine 430 off. The drive system 420 is deactivated when the user actuates the start actuator 439 or in response to another appropriate stop condition (e.g., loss of operator presence detection, loss of input from a dead-man's switch, an improper attempt to mow in reverse, etc.). Upon deactivation of the drive system 420, the PTO clutch 434 is deactivated so that the implement 424 is not engaged when the drive system 420 is restarted.

In some embodiments, the drive system 420 provides two operating conditions: a first or all-electric operating condition and a second or hybrid operating condition. Within both the all-electric and hybrid operating conditions, the PTO clutch 434 may be engaged or disengaged as needed to drive or not drive the implement 424. Within the hybrid operating condition, the drive system 420 can provide a hybrid-generator mode in which the motor/generator 432 operates as a generator and a hybrid-motor mode in which the motor/generator 432 operates as a motor. In some embodiments, the two operating conditions are automatically implemented by the control unit 440 in response to one or more inputs.

In some embodiments, the engine 430 is operable at different speeds and at different engine throttle positions (e.g., the engine 430 is controlled by an electronic throttle or governor). The control unit 440 controls the engine speed and engine throttle position. The rate of change of the SOC in the hybrid operating condition with the implement 424 engaged can be controlled by varying the throttle position. With the implement 424 engaged, the engine 430 is run at a targeted constant engine speed, which corresponds to the implement 424 speed. When the implement is disengaged, the rate of change of the SOC can be controlled by varying one or both of the engine speed and the engine throttle position. The engine speed can also be controlled to control the speed of the implement 424 (e.g., mower blade). For example, the engine speed can be controlled to maintain a constant mower blade speed. Under heavier load on the motor/generator output shaft 462, the throttle is opened to maintain the desired implement speed. Under lighter loads, the throttle is closed to maintain the desired implement speed. In situations where there is a sudden drop in load (e.g., when the PTO clutch 434 is disengaged), the motor/generator 432 switches to the hybrid-generator mode to keep the engine 430 from over speeding until the throttle can reach the appropriate position. Additionally, the control unit 440 can monitor for a run-away engine condition by comparing the difference in speed between the engine 430 and the motor-generator 432, and turning the engine 430 off if this difference exceeds a predetermined value.

The drive system 420 switches from the all-electric operating condition to the hybrid operating condition in response to the charge of the energy storage device 436. The charge of the energy storage device 436 can be described in terms of either SOC or DOD. The following descriptions will use SOC. In some embodiments, the hybrid-generator mode is automatically implemented when the SOC reaches or drops below a first predetermined level of SOC between 100% and 0% (e.g., 80%, 75%, 70%, 20%, etc.). The drive system will revert to the all-electric operating mode when the SOC exceeds a second predetermined level of SOC. In some embodiments, the second predetermined level of SOC is equal to the first predetermined level of SOC. In other embodiments, the second predetermined level of SOC is greater than the first predetermined level of SOC. The predetermined levels can be set by the manufacturer or set by the user. The user can use the input device 466 to input the predetermined levels of SOC into the control unit 440. The predetermined levels of SOC can be directly entered by the user, or calculated by the control unit 440 based on a different input by the user. For example, the user may input an expected run time required to complete a specific task (e.g., mowing the user's lawn) with the outdoor power equipment 10. The calculation to determine the first predetermined level of SOC may also include various other inputs included expected current draw from the energy storage device 436, expected load on the implement 424, expected load on the motor/generator 432, targeted implement 424 speed (e.g. blade speed), targeted wheel speed, maximum wheel speed, minimum wheel speed, a desire to minimize engine run time (e.g., to save fuel), a desire to maximize engine run time, a desire to minimize operating noise (e.g., operating noise due to running the engine 430), or other factors that influence the rate of change of the SOC during operation of the outdoor power equipment 10. For example, the first predetermined level of SOC may be set based on the expected run time input by the user and the average current draw of the energy storage device 436 calculated from past instances of operating the outdoor power equipment 10.

The drive system 420 switches from the all-electric operating condition to the hybrid operating condition in response to an increase in the load on the motor/generator 432 above a predetermined load limit. In some embodiments, the hybrid-motor mode is automatically implemented when load on the motor/generator 432 exceeds the predetermined load limit (e.g., the current draw of the motor/generator, as measured in amps) so that the motor/generator 432 is available to assist the engine 430 in driving the motor/generator output shaft 462. In this way, in the hybrid-motor mode, the power to the motor/generator output shaft 462 is provided by either the engine 430 or both the engine 430 and the motor/generator 432. The increase in load on the motor/generator 432 can be due to one or more factors, including the load on the implement 424 (e.g., a mower blade requiring more power to cut heavy or wet grass). In some embodiments, when the drive wheel 422 is driven by a hydrostatic transmission driven by the motor/generator output shaft 462, an increased load on the drive wheel 422 (e.g., the drive wheel 422 requiring more power to provide increased fraction or wheel speed) can cause the load on the motor/generator 432 to increase above the predetermined load limit, thereby implementing the hybrid operating condition. In some embodiments, the hybrid-motor mode is configured to be implemented before the engine 430 reaches its full output. In some embodiments, the hybrid-motor mode is configured to use less than the full motor output power of the motor/generator 432, thereby reserving sufficient power for the motor/generator 432 to start the engine 430. In the hybrid-motor mode, the engine 430 acts as the primary power source for the motor/generator output shaft 462 with the motor/generator 432 acting as a reserve power supply to cover increases in load. In some embodiments, the motor/generator 432 provides power to the motor/generator output shaft 462 when the engine throttle is at wide open throttle or approaching wide open throttle and the engine speed continues to drop, so that the motor/generator 432 supplies additional power to the motor/generator output shaft 462 to maintain the implement speed. In some embodiments, the hybrid-motor mode is active until the engine throttle is below a predetermined throttle position or level for a predetermined amount of time. After this condition is met, the drive system 420 returns to the all-electric operating condition or the hybrid-generator mode, as appropriate. In some embodiments, the hybrid-motor mode is implemented when the load on the motor/generator 432 exceeds a predetermined sustained load limit for a first predetermined period of time and is also implemented when the load on the motor/generator exceeds a predetermined instantaneous load limit for a second predetermined period of time (e.g., 500 milliseconds or less). The sustained load limit is less than the instantaneous load limit and the second predetermined period of time is less than the first predetermined period of time. In this way, the hybrid-motor mode is implemented both in response to sustained heavier loads and to instantaneous (or shock) heavier loads. In some embodiments, the hybrid-motor mode takes precedence over the hybrid-generator motor. That is, an increase in load on the motor/generator 432 above the predetermined load limit causes the drive system 420 to implement the hybrid-motor mode without regard for the SOC of the energy storage device 436.

Figure 13:
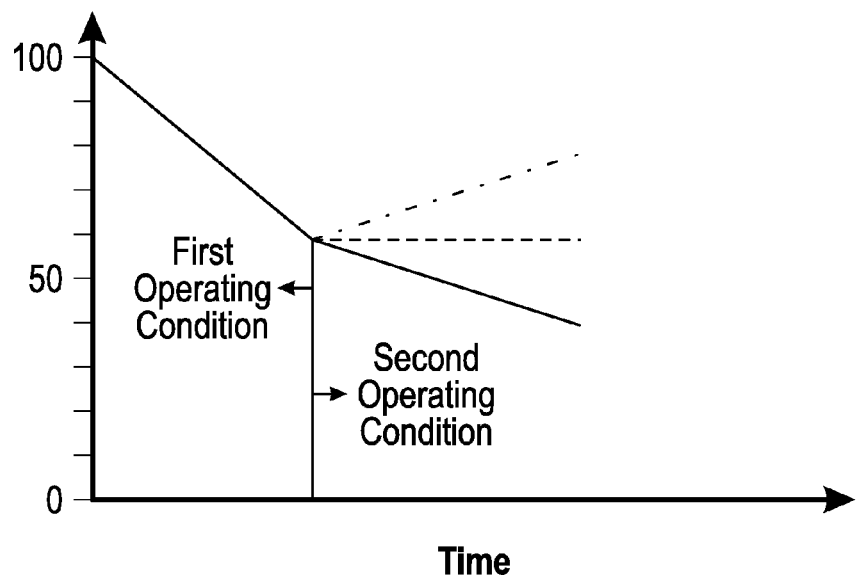
FIG. 13 is a graph of state of charge of an electronic storage device versus time.

As shown in FIG. 13, in the all-electric operating condition, the rate of change of the SOC of the energy storage device 436 is negative. This is because both the motor 438 and the motor/generator 432 are drawing power from the energy storage device 436, thereby reducing the SOC. In the hybrid operating mode, the rate of change of the SOC changes relative to the rate of change of the SOC in the all-electric operating condition. In some embodiments, as shown by the solid line, in the hybrid-generator mode, the rate of change of the SOC can remain negative, indicating that the motor/generator 432 provides power to the energy storage device 436, but not enough to overcome the draw on the energy storage device 436, thereby reducing the rate of change of the SOC from the all-electric mode, in which no power is supplied to the battery storage device 436. This can be used when limiting the power draw on the energy storage device 436 to a predetermined limit (e.g., 500 watts). In some embodiments, as shown by the dashed line, in the hybrid-generator mode, the rate of change of the SOC can be zero, indicating that the power provided by the engine 430 to the motor/generator output shaft 462 is sufficient to both drive the implement 424 and drive the motor/generator 432 as a generator mode to provide sufficient power to the energy storage device 436 to maintain the SOC of the energy storage device 436 at a constant level. This maintains the SOC of the energy storage device 436 (e.g., to provide reserve power that may be needed for heavy cutting conditions). Also, this allows for the engine to be operated at a reduced load (e.g., engine speed or throttle position) based on demand. By operating at reduced engine loads, the noise generated by the engine 430 can be reduced. In some embodiments, as shown by the dashed-dot line, in the hybrid-generator mode, the rate of change of the SOC can be positive, indicating the motor/generator 432 provides sufficient power to the energy storage device 436 to overcome the draw on the energy storage device 436 so that the energy storage device 436 is recharged. The motor/generator 432 can charge the energy storage device 436 until the second predetermined level of SOC is achieved or until a predetermined amount of power is supplied to the energy storage device 436 (e.g., 500 watts, 1000 watts, 1500 watts, 2000 watts, etc.).

When the rate of change of the SOC in the hybrid operating condition is negative, the amount of fuel used by the engine 430 and the noise level of the outdoor power equipment 10 can be reduced by reducing the amount of time the engine 430 is on relative to operating schemes in which the rate of change of the SOC in the hybrid operating condition is zero or positive. In this way, the power from the engine 430 is not used to increase or maintain the SOC of the energy storage device, but rather to extend the operation time of the outdoor power equipment available to the user, relative to the all-electric mode, by reducing the rate of change of the SOC.

Once in the hybrid operating condition, the rate of change of the SOC of the energy storage device 436 also can vary in response to the load on the implement 424 (e.g., a mower blade requiring more power to cut heavy or wet grass) and the load on the drive wheel 422 (e.g., the drive wheel 422 requiring more power to provide increased traction or wheel speed). As the load on the implement 424 and the drive wheel 422 varies, more or less power is provided by the engine 430 via the motor/generator output shaft 462 to the implement 424 and the drive wheel 422 as needed to respond to the varying loads. When more power from the engine 430 is needed by the implement 424 and/or the drive wheel 422, less power is available from the engine 430 to offset the draws on the energy storage device 436. Accordingly, the rate of change of the SOC varies as needed in order to maintain the implement 424 at a targeted implement speed (e.g., blade speed) and to maintain the drive wheel 422 at a targeted wheel speed (e.g., the speed called for by the user input to the foot pedal or throttle).

In some embodiments, a return mode is implemented by the control unit 440 when the SOC of the energy storage device 436 reaches or passes a predetermined lower limit of SOC or return SOC (e.g., 40%, 30%, 20%, etc.). In some embodiments, the return SOC is based on the minimum recommended SOC for the type of energy storage device 436 used (e.g., 20% SOC for lead-acid batteries). In return mode, the implement 424 is disengaged so that it does not draw power from the energy storage device 436. Alternatively or additionally, the maximum wheel speed of the drive wheel 422 is reduced to reduce the power required by the motor 438 to drive the drive wheel 422. In some embodiments, the return mode is implemented when the engine 430 runs out of fuel, without regard for the current SOC. The return SOC is less than or equal to the first predetermined level of SOC at which the hybrid operating condition is implemented. For example, the first predetermined level of SOC and the return SOC could both be set at the minimum recommended SOC (e.g., 20%). As another example, the first predetermined level of SOC could be set at the minimum recommended SOC (e.g., 20%) and the return SOC set just below the minimum recommended SOC (e.g., 19%). In this way, the operating time in the all-electric operating condition is maximized, and the user is allowed to continue to operate the outdoor power equipment 10 with the implement 424 engaged, so long as the load on the implement 424 does not cause the SOC to drop below the minimum recommended SOC.

In some embodiments, a transport mode is implemented by the control unit 440 in response to a user input (e.g., via the input device 466). In the transport mode, the implement 424 cannot be engaged and the engine 430 cannot be turned on. In this way, the user is able to drive the outdoor power equipment 10 under electrical power, but not engage the implement 424 or enter a hybrid mode in which the engine is on. In some embodiments, the wheel speed of the drive wheel 422 is reduced in the transport mode.

In some embodiments, a fast drive mode is implemented by the control unit 440 in response to a user input (e.g., via the input device 466). In the fast drive mode, the maximum speed of the outdoor power equipment 10 is increased and the implement 424 cannot be engaged. Engaging the implement 424 will cause the control unit 440 to take the drive system 420 out of the fast drive mode.

In some embodiments, the user may input an add run time command via the input device 466 to cause the control unit 440 to recalculate the predetermined level of SOC or change the rate of change of the SOC in order to extend the run time of the outdoor power equipment past the previously input expected run time.

Figure 14:
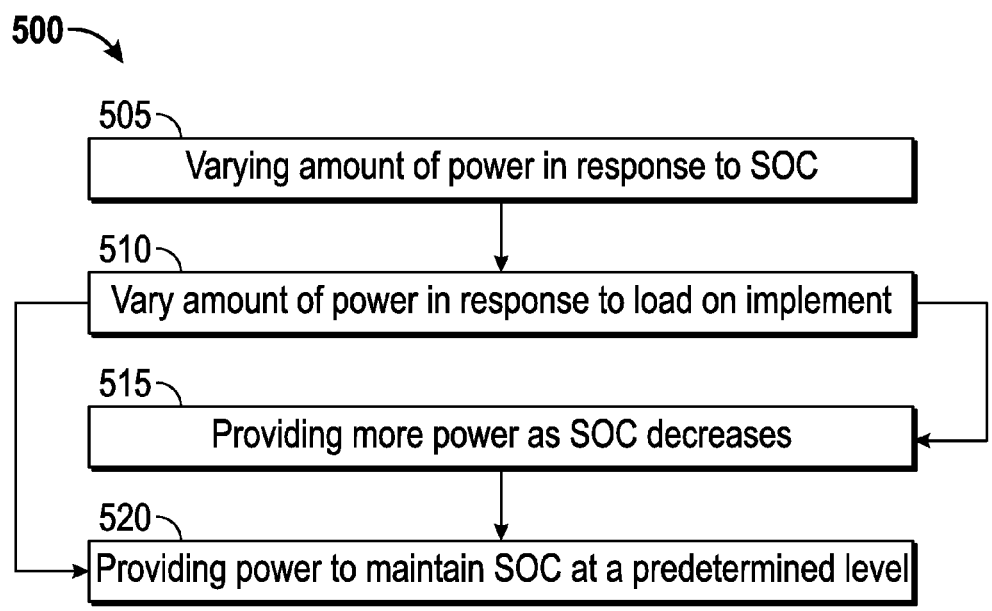
FIG. 14 is a flowchart of a method of charging an energy storage device.

Referring to FIG. 14, a method 500 of charging an energy storage device is shown according to an exemplary embodiment. For example, using the drive system 420 described above, the amount of power provided to the energy storage device 436 by the motor/generator 432 to charge the energy storage device 436 is varied in response to charge (e.g., SOC or DOD) of the energy storage device 436 (step 505). The amount of power provided to the energy storage device 436 by the motor/generator 432 can vary in response to changes in the load on the motor/generator 432 (e.g., due to the load on the implement 424) (step 510). In some embodiments, more power is provided to the energy storage device 436 by the motor/generator 432 as the SOC decreases (step 515). In some embodiments, when the SOC reaches a predetermined level (e.g., a minimum acceptable charge), power is provided to the energy storage device 436 by the motor/generator 432 at an amount sufficient to maintain the SOC at the predetermined level or to increase the SOC from the predetermined level (step 520). Other drive systems, including but not limited to drive systems 20, 120, 220, and 320 described above, can be used to implement the method 500.

Figure 15:
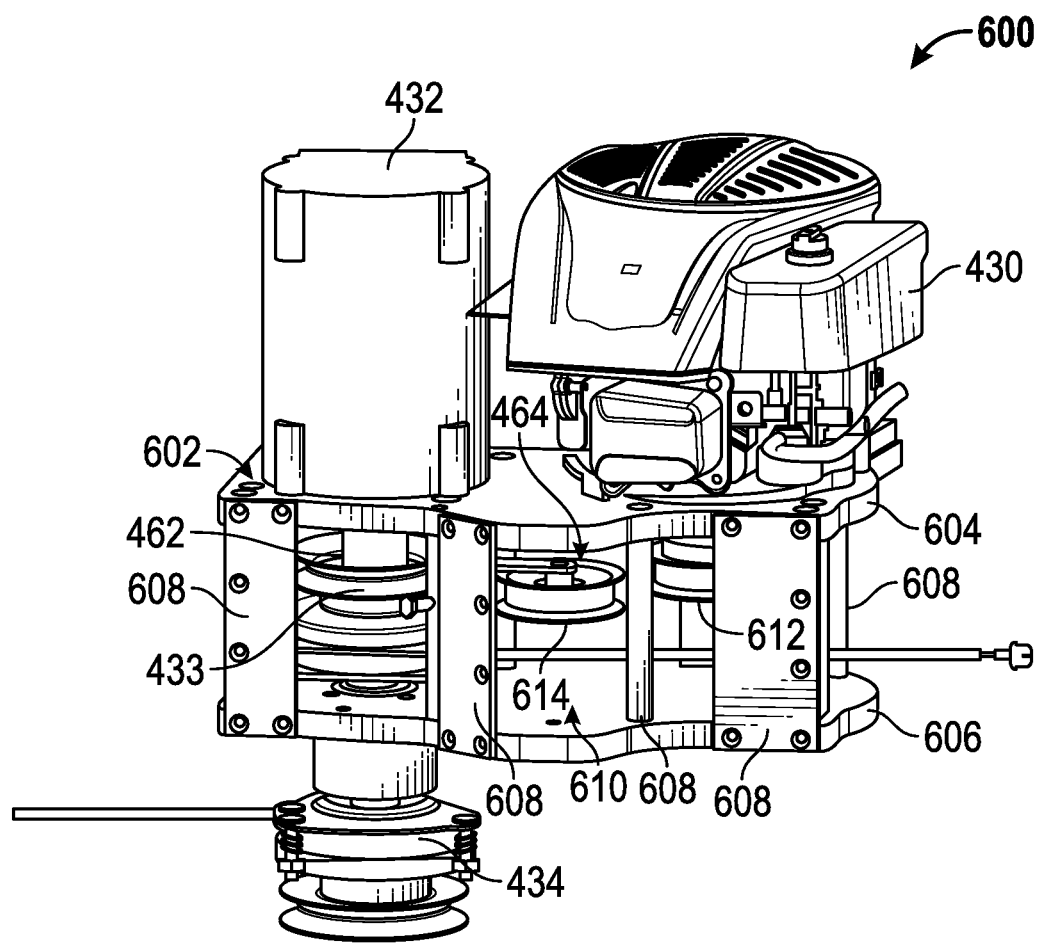
FIG. 15 is a perspective view of a power pack assembly according to an exemplary embodiment.
Figure 16:
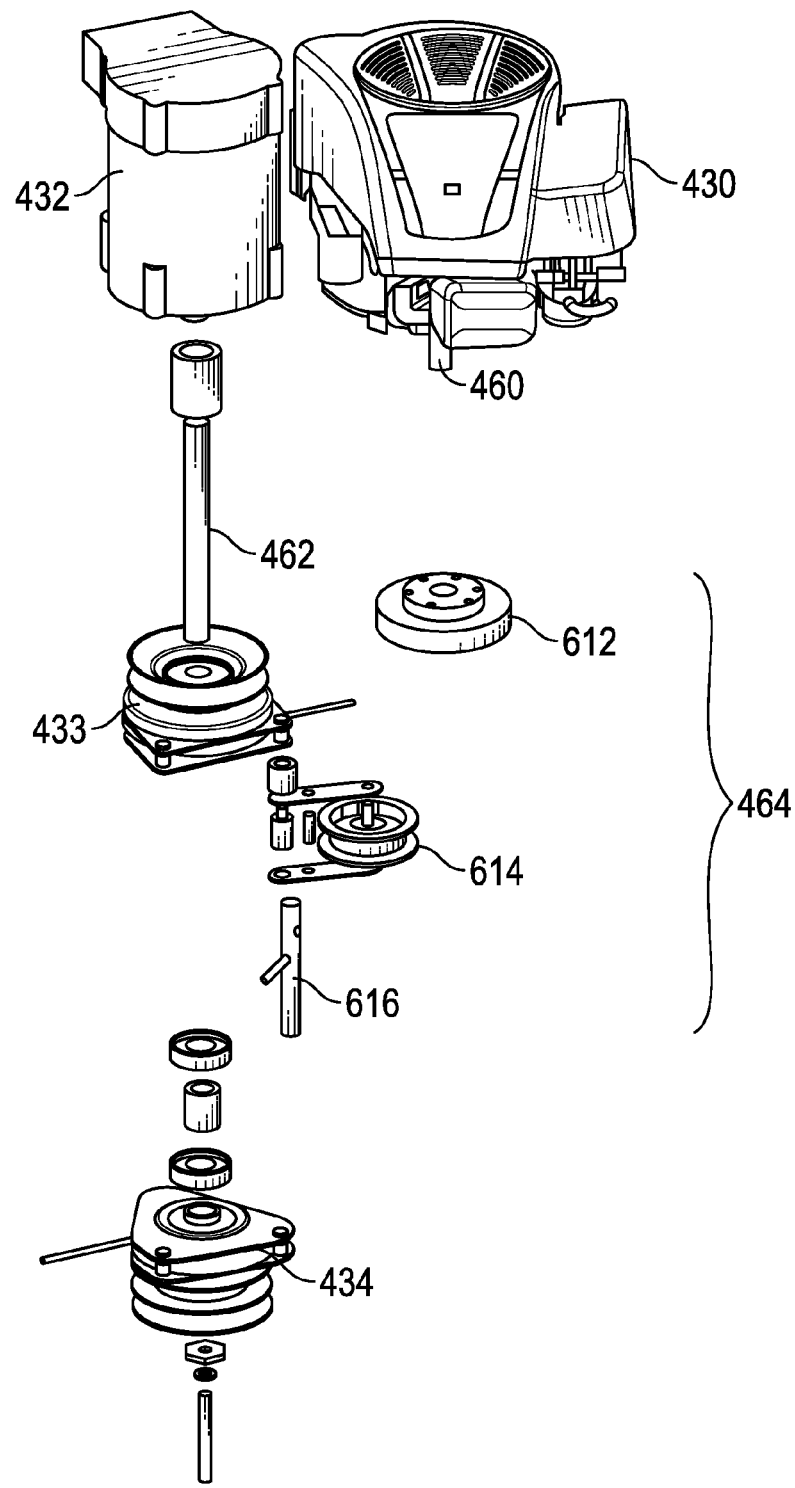
FIG. 16 is an exploded perspective view of a portion of the power pack assembly of FIG. 15.

Referring to FIGS. 15-16, a power pack assembly 600 is shown according to an exemplary embodiment. In some embodiments, the power pack assembly 600 is a component of the drive system 420 or the outdoor power equipment 10 described above. The power pack assembly 600 will be described with reference to the components introduced in the discussion above of drive system 420.

The power pack assembly 600 includes the engine 430, the motor generator 432, the engine coupling 433, and a frame 602 that supports the engine 430 and the motor/generator 432. The power pack assembly 600 is sized and shaped to serve as a similarly sized and shaped alternative to an internal combustion engine for use as the prime mover for a piece of outdoor power equipment (e.g., a lawn tractor, a lawn mower, a snow thrower, etc.). A manufacturer may install the power pack assembly 600 in a manner similar to an internal combustion engine. This allows the manufacturer to offer outdoor power equipment in both conventional (e.g., solely fuel powered) models with the internal combustion engine and hybrid models with the power pack assembly 600. This also allows the manufacturer to design a hybrid piece of power equipment with advanced knowledge of the size, shape, location of the output shaft, output power, and other fixed features of the power pack assembly 600. This can simplify design of the hybrid product because the prime mover for the drive system is bundled as a single component embodied as the power pack assembly 600, reducing the difficulty in integrating a hybrid drive system into the outdoor power equipment.

Figure 17:
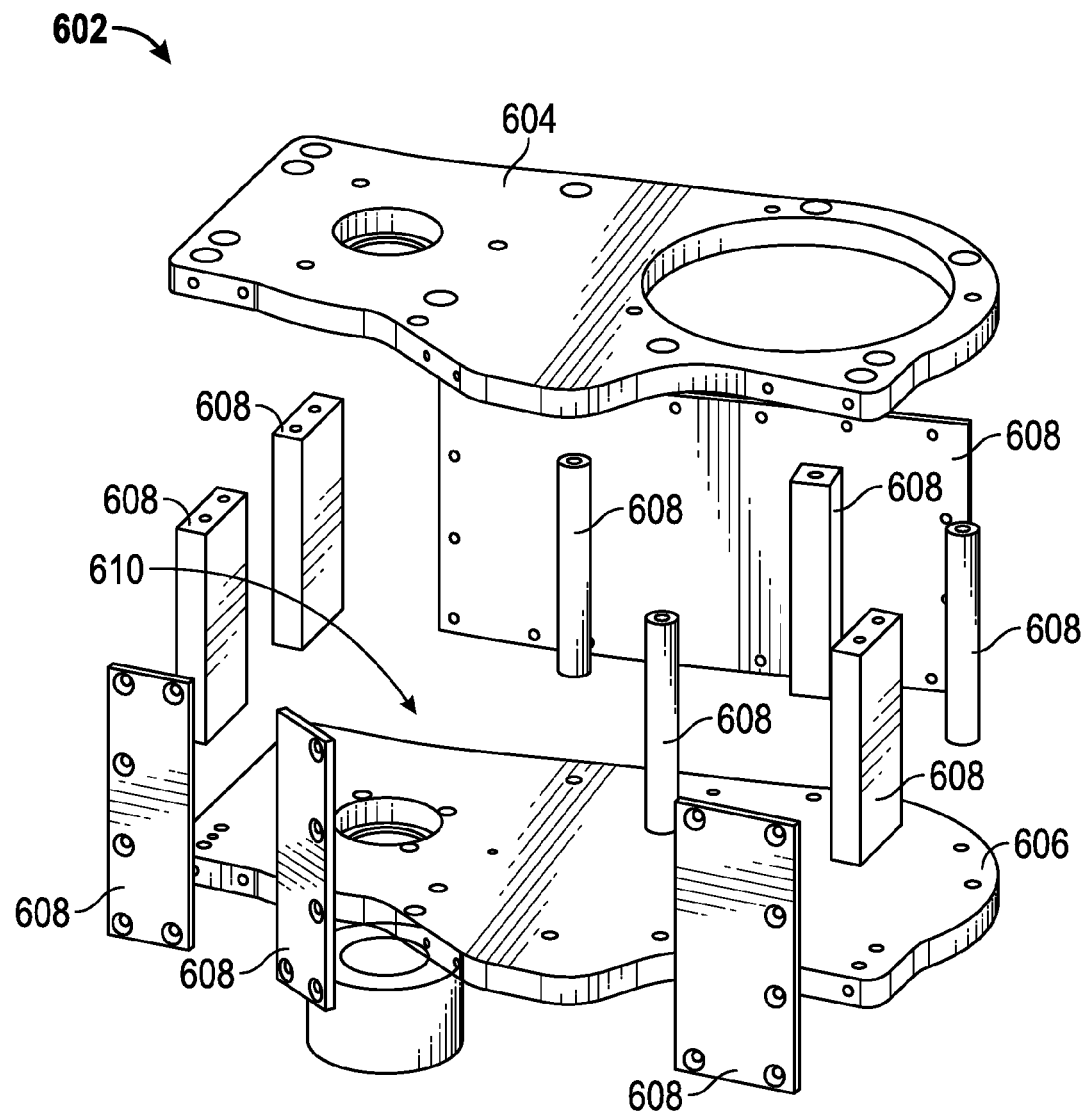
FIG. 17 is an exploded perspective view of a frame of the power pack assembly of FIG. 15.

Referring to FIG. 17, the frame 602 includes a upper frame member 604 and a lower frame member 606 secured by one another by multiple spacers 608. The upper frame member 604 is spaced apart from the lower frame member 606 such that a space 610 is defined between the upper frame member 604 and the lower frame member 606. Referring to FIG. 15, the engine 430 and the motor/generator 432 are secured to the top of the upper frame member 604 with the engine output shaft 460 and the motor/generator output shaft 462 each extend through the upper frame member 604 into the space 610 (e.g., through a hole, opening, aperture, slot, etc.). The motor/generator output shaft 462 also extends through the lower frame member 606. The engine coupling 433 is disposed in the space 610.

Figure 18:
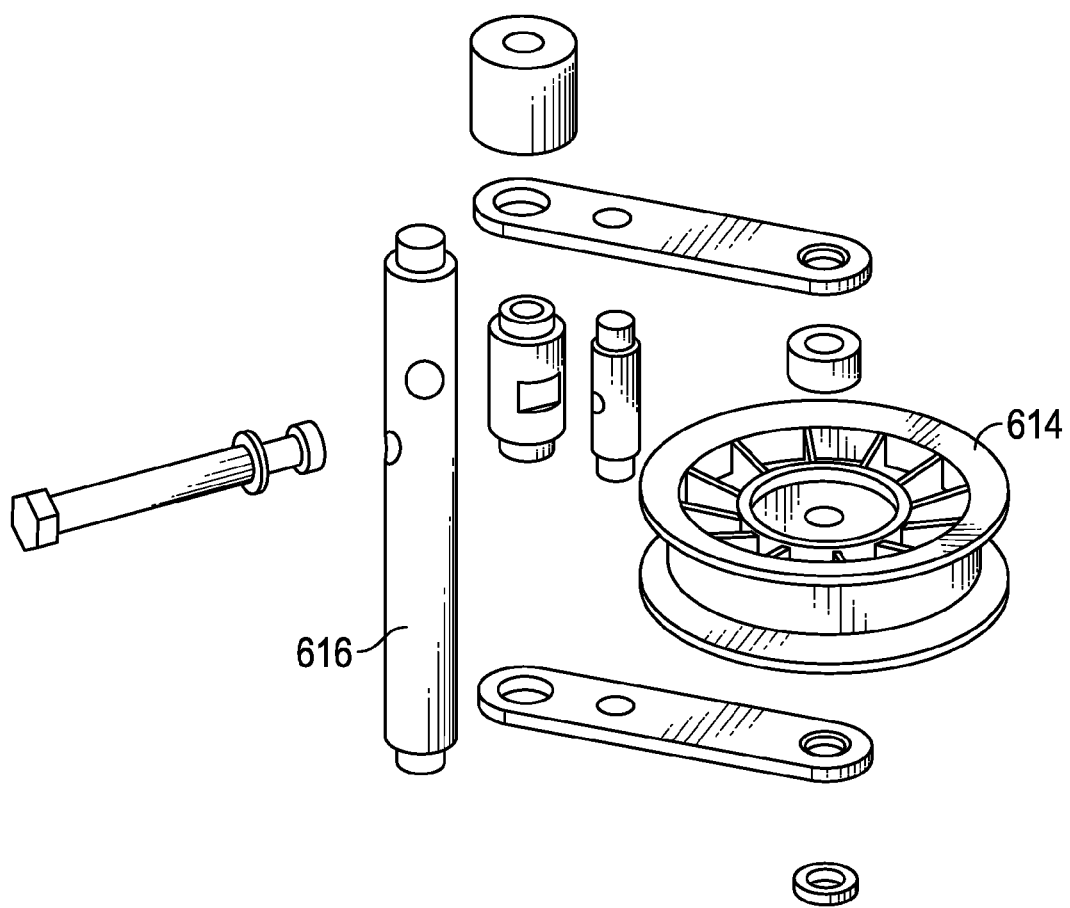
FIG. 18 is an exploded perspective view of an idler pulley assembly of the power pack assembly of FIG. 15.

Referring to FIG. 16, in some embodiments, the transmission 464 couples the engine output shaft 460 to the engine coupling 433. In some embodiments, the transmission 464 includes a pulley 612 coupled to the engine output shaft 460, a movable idler pulley 614, and a belt (not shown) that is engaged or coupled to the pulley 612, the idler pulley 614, and the engine coupling 433. In some embodiments, a CVT can replace or supplement the pulley 612. The CVT allows the engine speed can be optimized (e.g., for NVH) relative to a desired motor/generator output shaft 462 or implement 424 speed (e.g., 1200 rpm, 1400, rpm, 1600 rpm, 1800 rpm, 2000 rpm, etc.). Referring to FIG. 18, the idler pulley 614 is pivotable about an axis through a pin 616 is configured to maintain tension on the belt. In some embodiments, the transmission 464 is disposed in the space 610.

Referring to FIGS. 15-16, in some embodiments, the power pack assembly 600 also includes the PTO clutch 434. In some embodiments, the PTO clutch 434 is located below the lower frame member 606 such that the lower frame member 606 is disposed between the PTO clutch 434 and the space 610.

The construction and arrangements of the lawn mower system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A lawn mower, comprising:
   an internal combustion engine;
   an energy storage device;
   a motor/generator including an output shaft, wherein when operating as a motor, the motor/generator is powered by the energy storage device and, when operating as a generator, the motor/generator provides power to the energy storage device;
   an engine coupling, wherein, with the engine coupling disengaged, the motor/generator drives the output shaft, and with the engine coupling engaged, the engine or both the motor/generator and the engine drive the output shaft;
   a mower blade;
   a power take-off clutch, wherein with the power take-off clutch engaged, the output shaft drives the mower blade, with the power take-off clutch disengaged, the mower blade is not driven; and
   a control unit configured to implement a first operating condition in which the engine coupling is disengaged, the engine is off, and the output shaft is driven by the motor/generator, and configured to implement a second operating condition in which the engine coupling is engaged, the engine is on, and the output shaft is driven by the engine or both the motor/generator and the engine.

2. The lawn mower of claim 1, wherein the energy storage device has a state of charge, and wherein the control unit is configured to automatically implement the second operating condition when the state of charge is below a predetermined state of charge.

3. The lawn mower of claim 2, wherein, in the first operating condition, a rate of change of the state of charge of the energy storage device is negative, and wherein, in the second operating condition, the rate of change of the state of charge changes relative to the rate of change in the first operating condition.

4. The lawn mower of claim 1, wherein, in the second operating condition, power from the motor/generator is provided to the energy storage device.

5. The lawn mower of claim 1, wherein the control unit is configured to automatically implement the second operating condition when a load on the motor/generator exceeds a predetermined load.

6. The lawn mower of claim 5, wherein, in the second operating condition, power from the motor/generator is provided to the mower blade.

7. The lawn mower of claim 1, wherein the energy storage device has a state of charge, wherein the control unit is configured to automatically implement the second operating condition when the state of charge is below a predetermined state of charge, and wherein the control unit is configured to automatically implement the second operating condition when a load on the motor/generator exceeds a predetermined load.

* * * * *